(12) United States Patent
Nagakari

(10) Patent No.: US 12,384,050 B2
(45) Date of Patent: Aug. 12, 2025

(54) INFORMATION PROCESSING DEVICE, INFORMATION PROCESSING METHOD, AND PROGRAM

(71) Applicant: Sony Group Corporation, Tokyo (JP)

(72) Inventor: Satoko Nagakari, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 240 days.

(21) Appl. No.: 18/005,856

(22) PCT Filed: Aug. 6, 2021

(86) PCT No.: PCT/JP2021/029383
§ 371 (c)(1),
(2) Date: Jan. 18, 2023

(87) PCT Pub. No.: WO2022/039058
PCT Pub. Date: Feb. 24, 2022

(65) Prior Publication Data
US 2024/0009857 A1    Jan. 11, 2024

(30) Foreign Application Priority Data
Aug. 20, 2020    (JP) .................................. 2020-139481

(51) Int. Cl.
*B25J 13/08*    (2006.01)
*B25J 9/16*    (2006.01)

(52) U.S. Cl.
CPC ............ *B25J 13/083* (2013.01); *B25J 9/1612* (2013.01)

(58) Field of Classification Search
CPC .......... B25J 9/16; B25J 13/083; B25J 9/1612; A45B 2009/002; A45B 2009/005;
(Continued)

(56) References Cited

U.S. PATENT DOCUMENTS 11,945,098 B2 *    4/2024    Redmond ............... G01N 19/02
2009/0031825 A1 *    2/2009    Kishida .................... G01L 5/228
73/862.621
(Continued)

FOREIGN PATENT DOCUMENTS

CN    1757490 A    4/2006
JP    S60221288 A    11/1985
(Continued)

OTHER PUBLICATIONS

N. Watanabe and G. Obinata, "Grip Force Control Based on the Degree of Slippage Using Optical Tactile Sensor," 2007 International Symposium on Micro-NanoMechatronics and Human Science, Nagoya, Japan, 2007, pp. 466-471, doi: 10.1109/MHS2007.4420900. (Year: 2007).*

(Continued)

*Primary Examiner* — Adam R Mott
*Assistant Examiner* — James Miller Watts, III
(74) *Attorney, Agent, or Firm* — XSENSUS LLP

(57) ABSTRACT

An information processing device according to one aspect of the present technology detects a slip generated in an object being gripped by a finger portion constituting a grip portion, and estimates an external force and an external moment applied to the object on the basis of the slip generated in the object. In addition, the information processing device controls the operation of an arm portion on the basis of the estimated external force and external moment to adjust at least one of the position or the posture of the finger portion constituting the grip portion provided in the arm portion. The present technology can be applied to a control device of a robot hand.

13 Claims, 21 Drawing Sheets

(58) Field of Classification Search
CPC . A45B 2009/007; A45B 2200/05; A45B 5/00;
A45B 9/00; A45B 9/02; A45B 9/04;
A47C 13/00; A47C 9/10; G05B
2219/39505; G05B 2219/39507; G05B
2219/40264; G05B 2219/40625
USPC .......................................................... 700/245
See application file for complete search history.

(56) References Cited

U.S. PATENT DOCUMENTS

| | | | |
|---|---|---|---|
| 2012/0022799 A1* | 1/2012 | Ikebe ..................... | B25J 13/082 702/41 |
| 2017/0036354 A1 | 2/2017 | Chavan Dafle et al. | |
| 2020/0189116 A1* | 6/2020 | Shoji ...................... | B25J 9/1607 |
| 2021/0146532 A1* | 5/2021 | Rodriguez Garcia ...................... | B25J 9/0087 |

FOREIGN PATENT DOCUMENTS

| | | | | |
|---|---|---|---|---|
| JP | 2005-329512 | A | | 12/2005 |
| JP | 2007-276112 | A | | 10/2007 |
| JP | 2007253266 | A | * | 10/2007 |
| JP | 2009-69028 | A | | 4/2009 |
| JP | 2009066683 | A | | 4/2009 |
| JP | 2009069028 | A | * | 4/2009 |
| JP | 2009-255191 | A | | 11/2009 |
| JP | 2011088260 | A | | 5/2011 |
| JP | 2011-115924 | A | | 6/2011 |
| JP | 2011209103 | A | | 10/2011 |
| JP | 2012-206206 | A | | 10/2012 |
| JP | 2012-228764 | A | | 11/2012 |
| JP | 2017-87325 | A | | 5/2017 |
| JP | 2017087325 | A | * | 5/2017 |
| JP | 2019-194534 | A | | 11/2019 |
| JP | 2020-34425 | A | | 3/2020 |
| WO | WO-2019244661 | A1 | | 12/2019 |

OTHER PUBLICATIONS

Translation of JP-2017087325-A (Year: 2017).*
Translation of JP-2009069028-A (Year: 2009).*
Translation of JP-2007253266-A (Year: 2007).*
T. Narita, S. Nagakari, W. Conus, T. Tsuboi and K. Nagasaka, "Theoretical Derivation and Realization of Adaptive Grasping Based on Rotational Incipient Slip Detection," 2020 IEEE International Conference on Robotics and Automation (ICRA), Paris, France, 2020, pp. 531-537, doi: 10.1109 (Year: 2020).*
International Search Report and Written Opinion mailed on Oct. 26, 2021, received for PCT Application PCT/JP2021/029383, filed on Aug. 6, 2021, 11 pages including English Translation.

* cited by examiner

FIG. 2
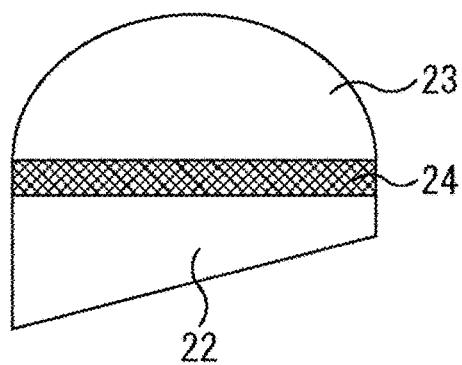
A
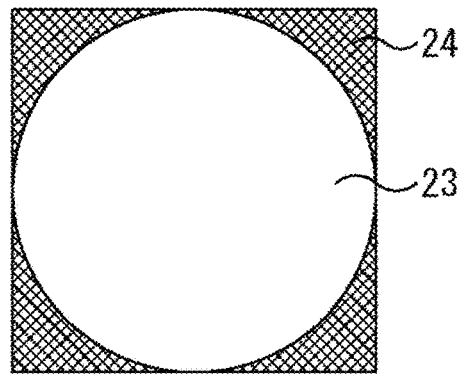
B

FIG. 5
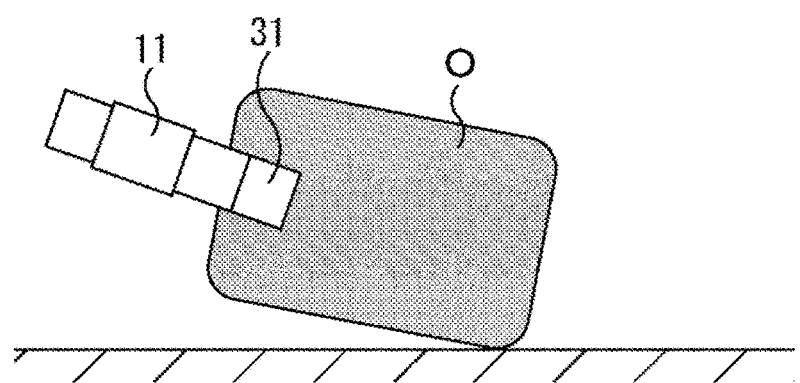
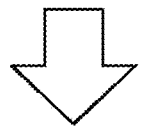
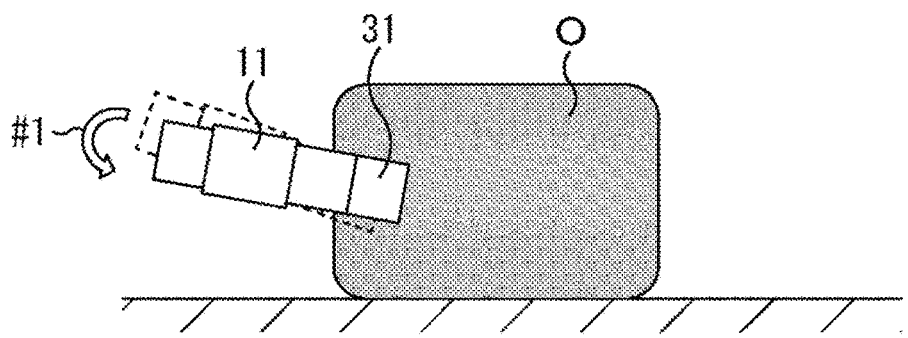

INFORMATION PROCESSING DEVICE, INFORMATION PROCESSING METHOD, AND PROGRAM

CROSS-REFERENCE TO RELATED APPLICATIONS

The present application is based on PCT filing PCT/JP2021/029383, filed Aug. 6, 2021, which claims priority to Japanese Application No. 2020-139481, filed Aug. 20, 2020, the entire contents of each are incorporated herein by reference.

TECHNICAL FIELD

The present technology particularly relates to an information processing device, an information processing method, and a program with which it is possible to place a gripped object more stably.

BACKGROUND ART

Various technologies have been proposed as technologies for gripping and stably placing an object with a robot hand.

For example, Patent Document 1 discloses a technology of transferring a workpiece to the vicinity of a target position, then, dropping the workpiece on a flat surface by reducing a gripping force of a hand portion, and aligning the workpiece with the flat surface. When the workpiece is dropped onto the flat surface, a slip is detected using a slip sensor, and the gripping force is adjusted so that an amount of the slip of the workpiece is equal to or less than a preset threshold.

CITATION LIST

Patent Document

Patent Document 1: Japanese Patent Application Laid-Open No. 2012-206206
Patent Document 2: Japanese Patent Application Laid-Open No. 2009-255191
Patent Document 3: Japanese Patent Application Laid-Open No. 2007-276112

SUMMARY OF THE INVENTION

Problems to be Solved by the Invention

In the technology described in Patent Document 1, it is necessary to set a threshold of an amount of slip in advance for each object, and thus, it is difficult to apply the technology to an unknown object. In addition, since the workpiece is dropped with the force of gravity, an excessive impact may be applied to the workpiece.

The present technology has been made in view of such a situation, and an object of the present technology is to place a gripped object more stably.

Solutions to Problems

An information processing device according to one aspect of the present technology includes: a slip detecting unit that detects a slip generated in an object gripped by a finger portion constituting a grip portion; an estimation unit that estimates an external force and an external moment applied to the object on the basis of the slip generated in the object; and an arm control unit that controls an operation of an arm portion on the basis of the estimated external force and external moment to adjust at least one of a position or a posture of the finger portion constituting the grip portion provided in the arm portion.

In one aspect of the present technology, a slip generated in the object being gripped by the finger portion constituting the grip portion is detected, and an external force and an external moment applied to the object are estimated on the basis of the slip generated in the object. In addition, the operation of the arm portion is controlled on the basis of the estimated external force and external moment to adjust at least one of the position or the posture of the finger portion constituting the grip portion provided in the arm portion.

BRIEF DESCRIPTION OF DRAWINGS

FIG. 2 is an enlarged view illustrating a part of a fingertip portion.
FIG. 5 is a diagram illustrating a state in which a gripped object is placed.

MODE FOR CARRYING OUT THE INVENTION

Figure 1:
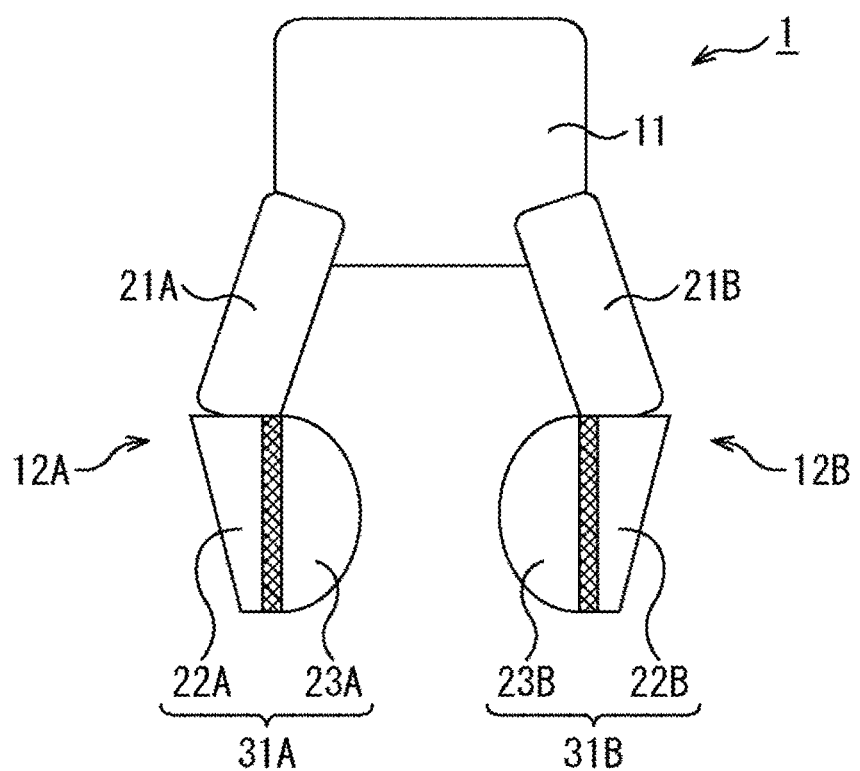
FIG. 1 is a diagram illustrating an appearance of a robot hand according to an embodiment of the present technology.

Modes for carrying out the present technology will be described below. The description will be given in the following order.
1. Configuration of robot hand
2. Placement of unknown object 3. Estimation of external force and external moment using slip detection
4. Configuration of information processing device
5. Operation of information processing device
6. Calculation of fingertip rotational displacement amount $\Delta u_{theta}$
7. Modification
8. Other examples Configuration of Robot Hand FIG. 1 is a diagram illustrating an appearance of a robot hand according to an embodiment of the present technology.

As illustrated in FIG. 1, a hand portion 1 which is the robot hand according to the embodiment of the present technology is a gripper type grip portion with two fingers. A finger unit 12A and a finger unit 12B constituting two fingers are attached to a base 11. The base 11 functions as a support for supporting the plurality of finger units 12.

The finger unit 12A is obtained by connecting a member 21A and a member 22A each of which is a plate-shaped member having a predetermined thickness. The member 22A is mounted on the tip side of the member 21A attached to the base 11. The connection portion between the base 11 and the member 21A and the connection portion between the member 21A and the member 22A each have a predetermined range of motion. A contact portion 23A serving as a contact portion with an object to be gripped is provided inside the member 22A. The member 22A and the contact portion 23A constitute a fingertip portion 31A.

The finger unit 12B also has a configuration similar to that of the finger unit 12A. The member 22B is mounted on the tip side of the member 21B attached to the base 11. The connection portion between the base 11 and the member 21B and the connection portion between the member 21B and the member 22B each have a predetermined range of motion. A contact portion 23B is provided inside the member 22B. The member 22B and the contact portion 23B constitute a fingertip portion 31B.

In the following, in a case where it is not necessary to distinguish the finger unit 12A and the finger unit 12B, they are collectively referred to as finger unit 12 as appropriate. Other configurations provided in pairs will also be described collectively as appropriate.

FIG. 2 is an enlarged view illustrating a part of a fingertip portion 31. A of FIG. 2 illustrates a side surface of the fingertip portion 31, and B of FIG. 2 illustrates a front surface (inner surface) of the fingertip portion 31.

A tactile sensor 24 is provided below the contact portion 23 as illustrated with a hatch. As the tactile sensor 24, a pressure distribution sensor capable of detecting pressure at each position of the contact portion 23 is used, for example.

The contact portion 23 includes an elastic material such as rubber, and includes a hemispherical soft deformable layer.

Figure 3:
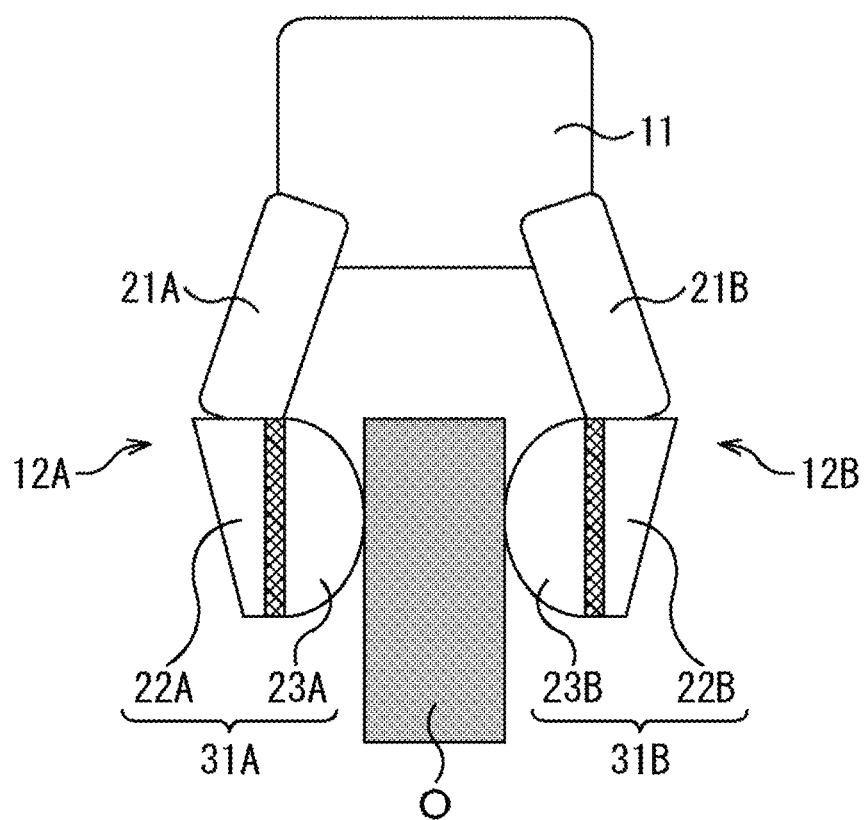
FIG. 3 is a diagram illustrating a state of gripping with the fingertip portion.

The fingertip portion 31A and the fingertip portion 31B have a parallel link mechanism. The fingertip portion 31A and the fingertip portion 31B are driven such that the inner surfaces are kept parallel. As illustrated in FIG. 3, an object O which is an object being gripped is gripped so as to be sandwiched between the contact portion 23A on the fingertip portion 31A side and the contact portion 23B on the fingertip portion 31B side, the fingertip portions 31A and 31B being arranged such that inner surfaces thereof are parallel to each other.

The contact portion 23 includes an elastic material, so that the contact portion 23 in contact with the object O is deformed with force of gravity or the like applied to the object O, as will be described in detail later.

Figure 4:
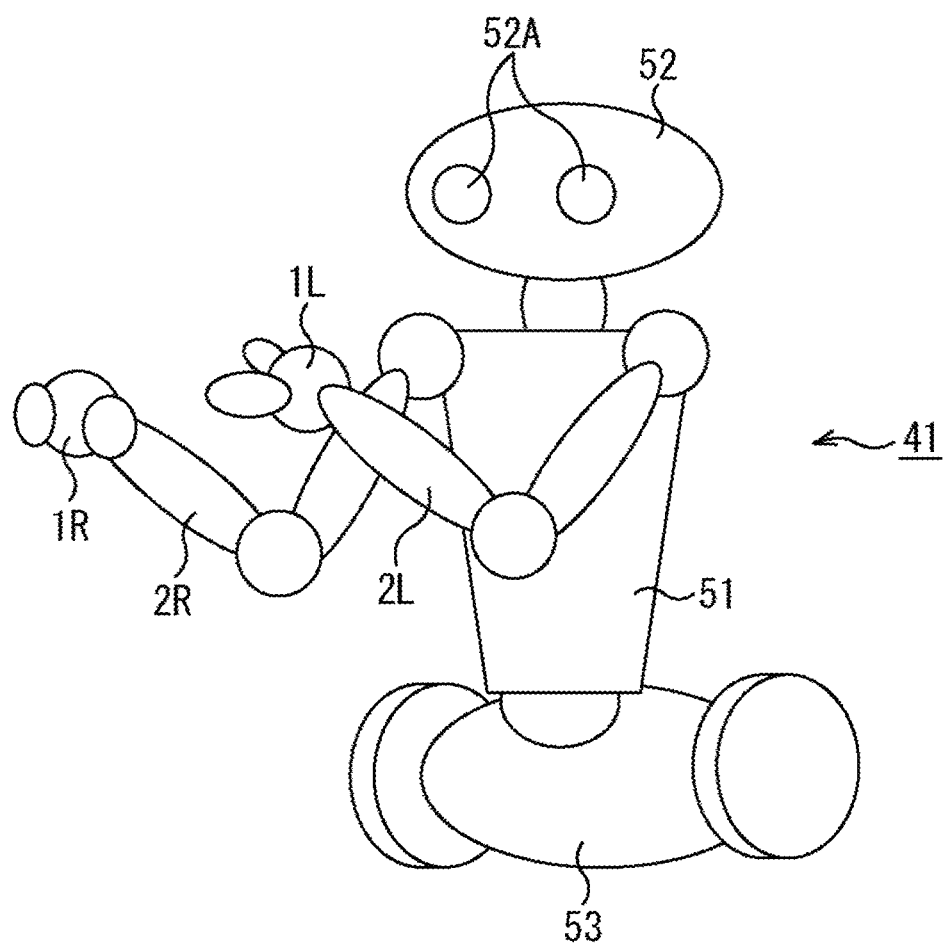
FIG. 4 is a diagram illustrating an example of an appearance of a robot to which a hand portion is attached.

FIG. 4 is a diagram illustrating an example of an appearance of a robot to which the hand portion 1 is attached.

As illustrated in FIG. 4, a robot 41 to which the hand portion 1 is attached is a robot having a humanoid upper body and a moving mechanism using wheels. A head 52 having a flattened spherical shape is provided on a body 51. A visual sensor 52A including an RGB camera or the like is provided on the front part of the head 52.

Arm portions 2L and 2R which are manipulators with multiple degrees of freedom are attached to an upper end of the body 51. Hand portions 1L and 1R which are end effectors are attached at the distal ends of the arm portions 2L and 2R, respectively. The hand portion 1L is the hand portion 1 serving as the left hand of the robot 41, and the hand portion 1R is the hand portion 1 serving as the right hand of the robot.

A carriage-shaped mobile unit 53 is provided at a lower end of the body 51. The robot 41 can move by rotating the wheels provided on the left and right of the mobile unit 53 or changing the direction of the wheels.

As described above, the robot 41 is capable of executing various tasks such as gripping an object by the hand portion 1 and gripping and carrying the object. The arm portions 2L and 2R attached to the movable robot 41 are so-called mobile manipulators.

Placement of Unknown Object

In order to grip an unknown object with a robot hand and stably place the unknown object, control of the robot hand in consideration of the following viewpoints is required. The unknown object indicates an object whose characteristics such as a mass, a position of a center of gravity, or a coefficient of friction are unknown.

In order to place the object without crushing the object or without causing a slip, it is necessary to place the object with an appropriate gripping force in consideration of an external force and an external moment.

In a case where the gripping state is changed due to rotation or the like caused by deviation of the center of gravity, it is necessary to place the object after adjusting the posture of the object.

FIG. 5 is a diagram illustrating a state in which a gripped object is placed (put).

A case where an oblong rectangular parallelepiped object O gripped with the fingertip portions 31 that hold the vicinity of a base is brought into contact with a floor surface from the bottom surface of the tip as illustrated in the upper diagram of FIG. 5 and is placed on the floor surface as illustrated in the lower diagram of FIG. 5 will be described. The floor surface serves as a placement surface. The arm portion 2 is moved during an operation of placing the object O in order to stably place the object O, by which the position and posture of the hand portion 1 including the fingertip portion 31 are controlled as indicated by an arrow #1.

Figure 6:
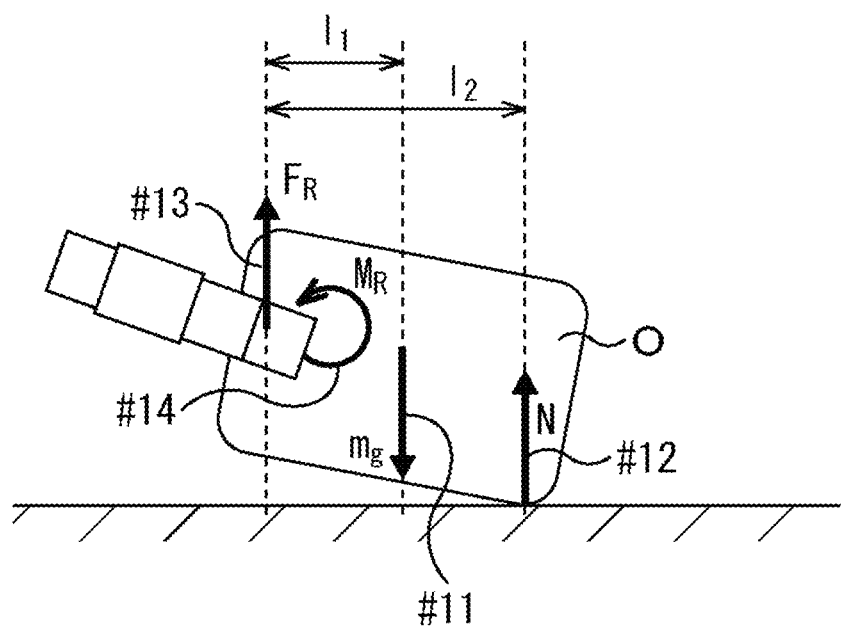
FIG. 6 is a diagram illustrating a force acting on an object.

FIG. 6 is a diagram illustrating a force acting on the object.

The gravity $m_g$ acts on the object O as indicated by an arrow #11. In addition, by bringing the object O into contact with the floor surface, an external force N acts as a normal force from the floor surface at a contact portion between the object O and the floor surface as indicated by an arrow #12.

In the fingertip portion 31, a shearing force $F_R$ acts as indicated by an arrow #13, and a moment $M_R$ acts as indicated by an arrow #14.

The balance between the force generated by the robot 41 and the force acting on the object O is expressed by Equation (1).

[Equation 1]

$$F_R = mg - N \quad (1)$$

In addition, the balance between the moment generated by the robot 41 and the moment acting on the object O is expressed by Equation (2).

[Equation 2]

$$M_R = mgl_1 - Nl_2 \quad (2)$$

In Equation (2), $l_1$ is a distance from the gripping position to the center of gravity of the object O (distance between perpendicular lines passing through the respective positions). In addition, $l_2$ is a distance from the gripping position to a position where the normal force acts (distance between perpendicular lines passing through the respective positions). The external moment which is the moment generated by the normal force from the floor surface is expressed as $Nl_2$.

Considering the plurality of finger units 12 provided in the hand portion 1, Equation (1) is expressed as Equation (3). In addition, Equation (2) is expressed as Equation (4). In Equations (3) and (4), the subscript i represents each finger.

[Equation 3]

$$\sum_{i=1}^{n} F_{Ri} = mg - N \quad (3)$$

[Equation 4]

$$\sum_{i=1}^{n} M_{Ri} = mg\,l_1 - Nl_2 \quad (4)$$

In the robot 41, a slip generated in the object O is detected using a slip sense achieved by the tactile sensor 24, and the external force N and the external moment $Nl_2$ are estimated on the basis of the detection result of the slip.

Estimation of External Force and External Moment Using Slip Detection

Figure 7:
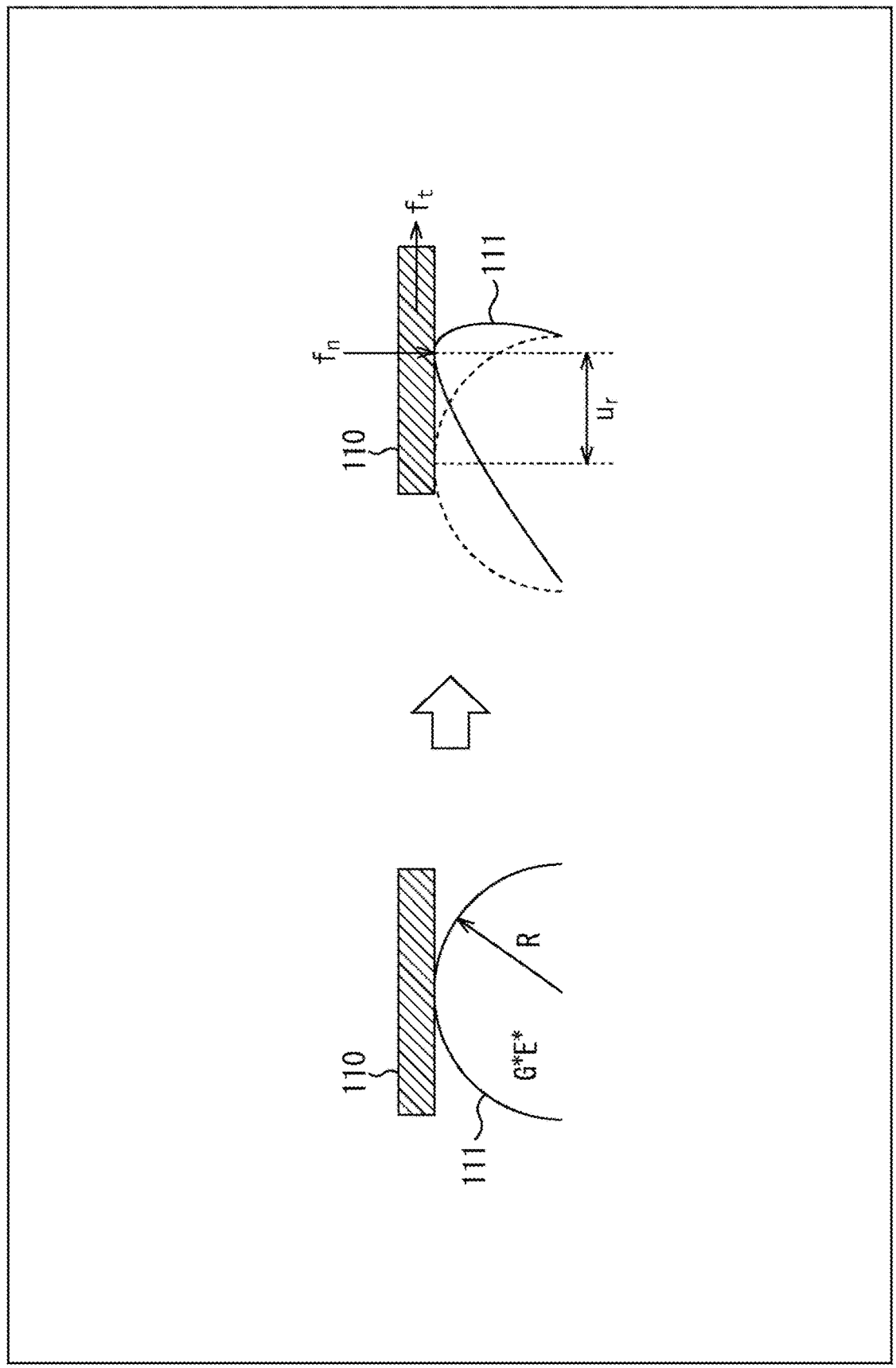
FIG. 7 is a diagram illustrating a model for describing the Hertz contact theory.

FIG. 7 is a diagram illustrating a model for describing the Hertz contact theory.

In FIG. 7, an elastic sphere 111 corresponds to the contact portion 23 of the hand portion 1, and a rigid flat plate 110 corresponds to the object O.

The left diagram of FIG. 7 illustrates a state in which the rigid flat plate 110 is in contact with the elastic sphere 111 in the horizontal direction. On the other hand, the right diagram of FIG. 7 illustrates a state in which the normal force $f_n$ is applied to the rigid flat plate 110 and the shearing force $f_t$ is applied in the horizontal direction.

When the shearing force $f_t$ is applied, the elastic sphere 111 is deformed in the direction of the shearing force $f_t$ as illustrated in the right diagram of FIG. 7. The position of the contact point between the rigid flat plate 110 and the elastic sphere 111 moves from the position before the shearing force $f_t$ is applied by a displacement amount $u_r$.

The displacement amount ur indicates a displacement amount generated at the fingertip portion 31 of the hand portion 1 in the robot 41. In the following, the displacement amount of the position generated in the fingertip portion 31 by the application of a force corresponding to the shearing force $f_t$ is referred to as a fingertip shearing displacement amount $u_r$. In addition, the displacement amount in the rotation direction generated in the fingertip portion 31 is referred to as fingertip rotational displacement amount $u_{theta}$. When a force corresponding to the shearing force $f_t$ is applied to the fingertip portion 31, the displacement in the rotational direction also occurs.

The fingertip shearing displacement amount $u_r$ is expressed by Equation (5) according to the Hertz contact theory.

[Equation 5]

$$u_r = \frac{f_t}{G^* \pi} \left( \frac{3 R f_n}{4 E^*} \right)^{-\frac{2}{3}} \quad (5)$$

In Equation (5), R is a radius of curvature of the elastic sphere 111. $G^*$ is a composite transverse elastic modulus of the elastic sphere 111 and the rigid flat plate 110, and $E^*$ is a composite longitudinal elastic modulus of the elastic sphere 111 and the rigid flat plate 110.

Here, the radius of curvature R, the composite transverse elastic modulus $G^*$, and the composite longitudinal elastic modulus $E^*$ are physical information of the elastic sphere 111 and the rigid flat plate 110, and are constants. The fingertip shearing displacement amount $u_r$ depends on the normal force $f_n$ and the shearing force $f_t$.

Meanwhile, the fingertip rotational displacement amount $u_{theta}$ is expressed by Equation (6).

[Equation 6]

$$u_{theta} = \frac{M}{G^* \pi R^{\frac{5}{3}}} \left( \frac{3 f_n}{4 E^*} \right)^{-\frac{2}{3}} \quad (6)$$

The fingertip rotational displacement amount $u_{theta}$ depends on the normal force $f_n$ and the moment M.

Next, a case where the external force N acts on the object O while the robot 41 grips the object O with the gripping force $f_{nR}$ will be considered. As described with reference to FIGS. 5 and 6, when the object O is placed on the floor surface, the external force N acts on the object O as a normal force.

Figure 8:
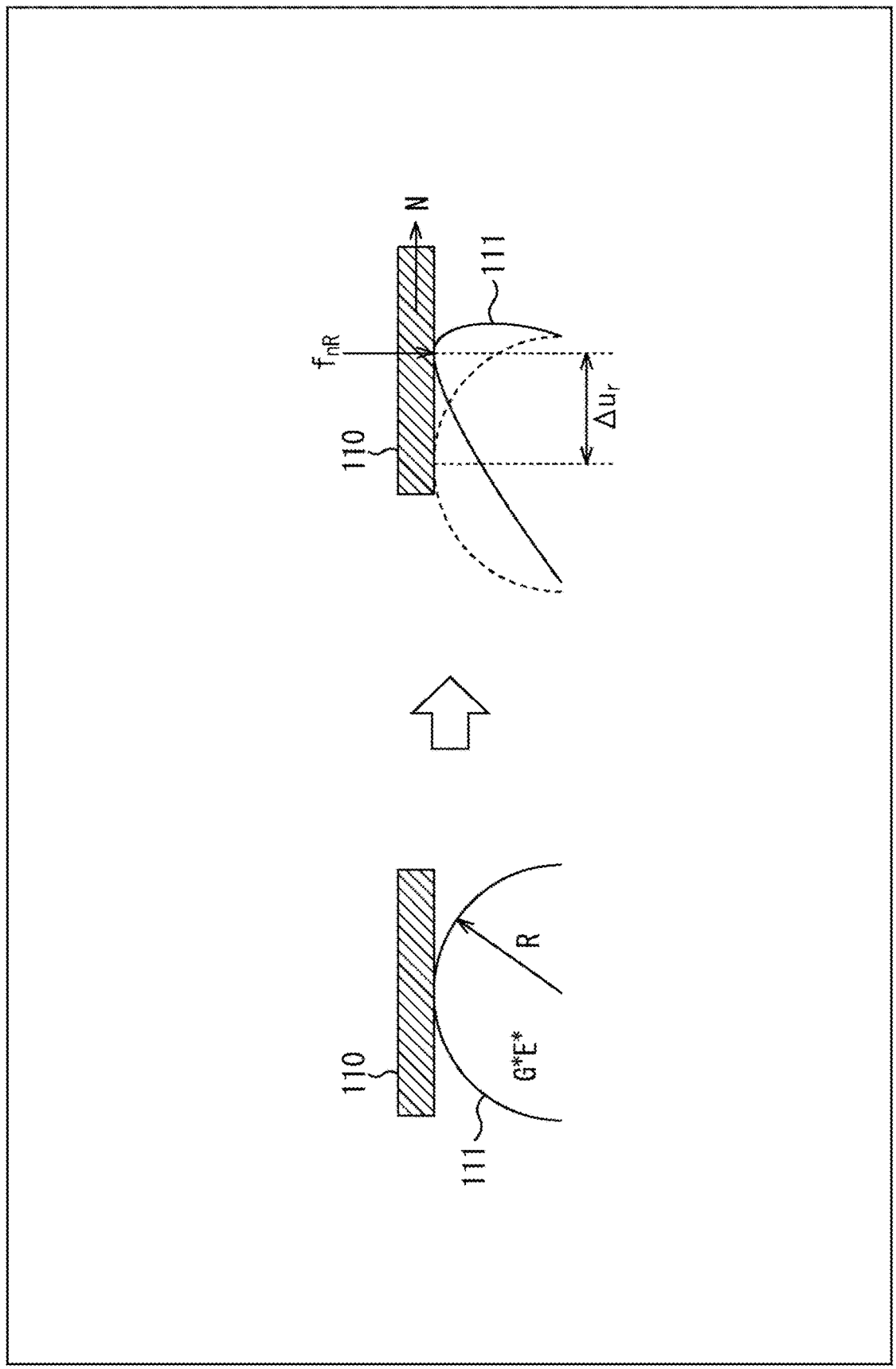
FIG. 8 is a diagram illustrating an example of a case where an external force acts on the object.

FIG. 8 is a diagram illustrating an example in which the case where the external force N acts on the object O is applied to the model described with reference to FIG. 7.

As illustrated in FIG. 8, the normal force $f_n$ in FIG. 7 corresponds to the gripping force $f_{nR}$. In addition, the shearing force $f_t$ in FIG. 7 corresponds to the external force N. In the state of FIG. 8, the moment M corresponds to the external moment $Nl_2$.

The fingertip shearing displacement amount $\Delta u_r$ which is the fingertip shearing displacement amount when the external force N acts on the object O is expressed as Equation (7) that is obtained by transforming Equation (5). In addition, the fingertip rotational displacement amount $\Delta u_{theta}$ which is the fingertip rotational displacement amount when the external force N acts on the object O is expressed as Equation (8) that is obtained by transforming Equation (6).

[Equation 7]

$$\Delta u_r = \frac{N}{G^*\pi}\left(\frac{3Rf_{nR}}{4E^*}\right)^{-\frac{2}{3}} \quad (7)$$

[Equation 8]

$$\Delta u_{theta} = \frac{Nl_2}{G^*\pi R^{\frac{5}{3}}}\left(\frac{3f_{nR}}{4E^*}\right)^{-\frac{2}{3}} \quad (8)$$

As expressed in Equation (7), the fingertip shearing displacement amount $\Delta u_r$ depends on the gripping force $f_{nR}$ and the external force N. Since the gripping force $f_{nR}$ is known in a control unit that controls the gripping force of the hand portion 1, the external force N can be estimated by observing the fingertip shearing displacement amount $\Delta u_r$.

As expressed in Equation (8), the fingertip rotational displacement amount $\Delta u_{theta}$ depends on the gripping force $f_{nR}$ and the external moment $Nl_2$. Since the gripping force $f_{nR}$ is known, the external moment $Nl_2$ can be estimated by observing the fingertip rotational displacement amount $\Delta u_{theta}$.

As will be described later, the fingertip shearing displacement amount $\Delta u_r$ and the fingertip rotational displacement amount $\Delta u_{theta}$ are observed on the basis of the detection result by the tactile sensor 24 in the robot 41. Furthermore, the external force N is estimated on the basis of the observation result of the fingertip shearing displacement amount $\Delta u_r$, and the external moment $Nl_2$ is estimated on the basis of the observation result of the fingertip rotational displacement amount $\Delta u_{theta}$.

Here, the fingertip shearing displacement amount $\Delta u_r$ and the fingertip rotational displacement amount $\Delta u_{theta}$ each correspond to a change (for example, a change per unit time) in the magnitude of slip of the elastic sphere 111 with respect to the rigid flat plate 110. In other words, the fingertip shearing displacement amount $\Delta u_r$ and the fingertip rotational displacement amount $\Delta u_{theta}$ are values indicating a degree of slip of the elastic sphere 111 with respect to the rigid flat plate 110.

Note that, in the slip illustrated in FIGS. 7 and 8, the absolute contact position moves while maintaining the relative positional relationship of the contact position between the elastic sphere 111 and the rigid flat plate 110, and thus, the slip illustrated in FIGS. 7 and 8 is a so-called initial slip.

The slip detected on the basis of the output of the tactile sensor 24 is an initial slip in which a fixed portion (a portion where static friction occurs) and a portion where slip occurs (a portion where dynamic friction occurs) are mixed on the contact surface between the contact portion 23 of the fingertip portion 31 and the gripped object. The external force N and the external moment $Nl_2$ are estimated using the initial slip.

Configuration of Information Processing Device

Figure 9:
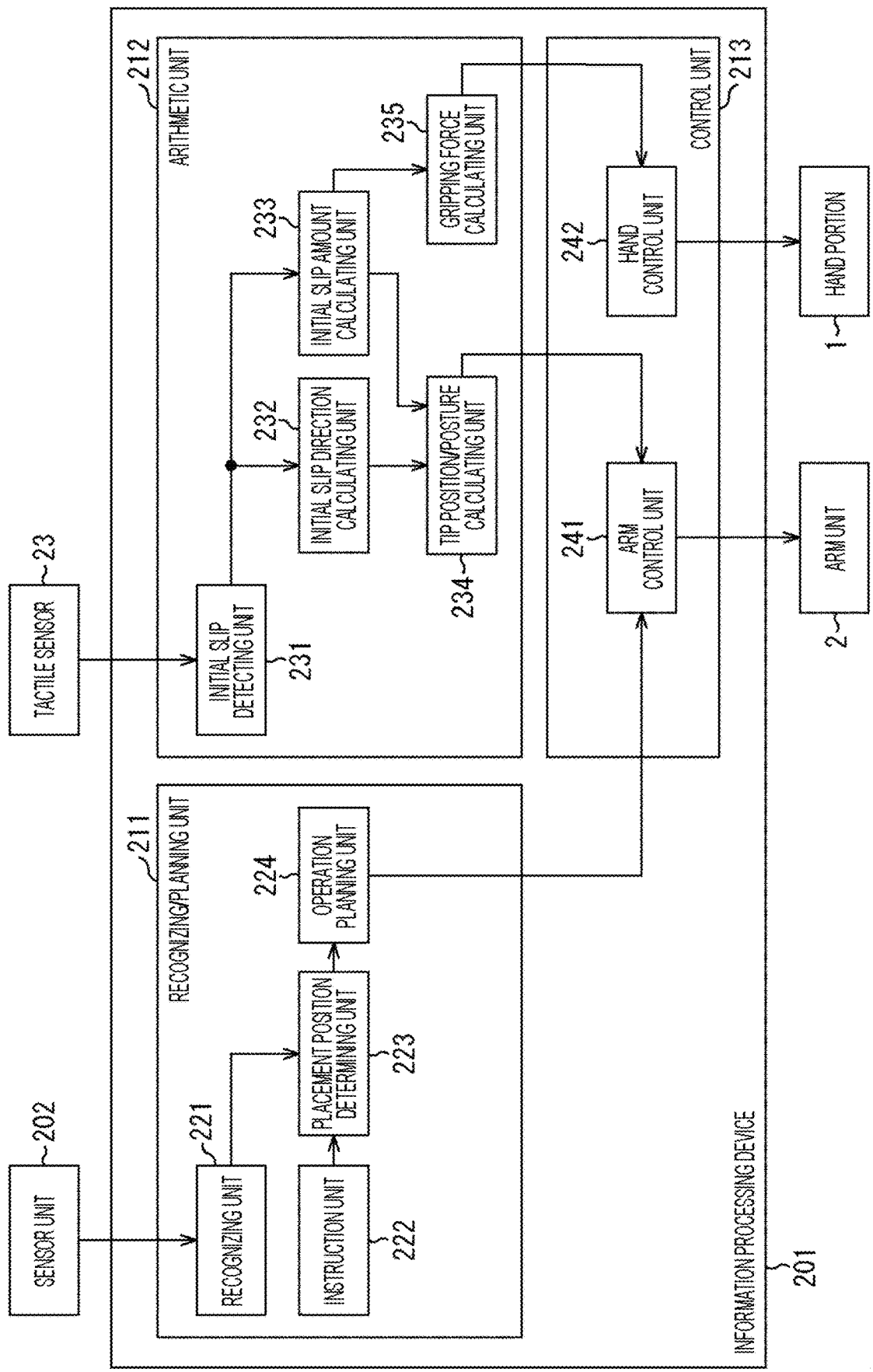
FIG. 9 is a block diagram illustrating a configuration example of an information processing device.

FIG. 9 is a block diagram illustrating a configuration example of an information processing device 201.

The information processing device 201 includes a computer such as a PC. The computer constituting the information processing device 201 is housed in, for example, the body 51. A CPU of the information processing device 201 executes a predetermined program to implement functional units illustrated in FIG. 9.

As illustrated in FIG. 9, a recognizing/planning unit 211, an arithmetic unit 212, and a control unit 213 are implemented in the information processing device 201.

The recognizing/planning unit 211 includes a recognizing unit 221, an instruction unit 222, a placement position determining unit 223, and an operation planning unit 224. Sensor data representing a detection result by a sensor unit 202 is input to the recognizing unit 221. The sensor unit 202 includes sensors provided in respective portion of the robot 41 including a visual sensor 52A. The sensor unit 202 includes various sensors such as an RGB camera, a distance sensor, a ToF sensor, a temperature sensor, a gyro sensor, and an acceleration sensor.

The recognizing unit 221 recognizes the situation of the robot 41 and the surrounding environment of the robot 41 on the basis of the sensor data supplied from the sensor unit 202. The environment to be recognized by the recognizing unit 221 includes the position and posture of the object being gripped. The recognition result by the recognizing unit 221 is supplied to the placement position determining unit 223.

The instruction unit 222 determines a task to be executed by the robot 41, and outputs information regarding the determined task to the placement position determining unit 223. For example, a task of placing the gripped object is determined.

The placement position determining unit 223 determines the placement position of the gripped object on the basis of the recognition result by the recognizing unit 221 and the task determined by the instruction unit 222. The placement position determining unit 223 outputs information regarding the placement position of the gripped object to the operation planning unit 224.

The operation planning unit 224 plans the operation of the arm portion 2 according to the placement position determined by the placement position determining unit 223, the current position of the arm portion 2, and the like. The operation planning unit 224 outputs information regarding the operation of the arm portion 2 to an arm control unit 241.

The arithmetic unit 212 includes an initial slip detecting unit 231, an initial slip direction calculating unit 232, an initial slip amount calculating unit 233, a tip position/posture calculating unit 234, and a gripping force calculating unit 235. The initial slip detecting unit 231, the initial slip direction calculating unit 232, and the initial slip amount calculating unit 233 are provided for each finger unit 12 so as to correspond to each finger unit 12.

The initial slip detecting unit 231 detects an initial slip on the basis of a detection result of a pressure distribution by the tactile sensor 24 functioning as a slip sense sensor. For example, the initial slip detecting unit 231 detects the movement of the center of pressure as the initial slip. A center of pressure $X_{cop}$ which is a position of the center of pressure in the X direction is expressed by Equation (9).

[Equation 9]

$$X_{cop} = \frac{\sum_{0}^{N-1}\{p(x_i)\cdot x_i\}}{\sum_{0}^{N-1} p(x_i)} \quad (9)$$

In Equation (9), $x_i$ represents a position (X coordinate) of the fingertip portion 31 in the X direction on the inner surface, and $p(x_i)$ represents a pressure at the position $x_i$. N represents the number of distributions. Similarly, the center of pressure is expressed in relation to the Y direction.

The detection of the initial slip by the initial slip detecting unit 231 is repeatedly performed at a predetermined sampling period. Information regarding the center of pressure at each timing detected by the initial slip detecting unit 231 is supplied to the initial slip direction calculating unit 232 and the initial slip amount calculating unit 233.

The initial slip direction calculating unit 232 calculates the direction of a change in the center of pressure as the direction of the initial slip on the basis of the detection result by the initial slip detecting unit 231. The information indicating the direction of the initial slip calculated by the initial slip direction calculating unit 232 is supplied to the tip position/posture calculating unit 234.

The initial slip amount calculating unit 233 calculates an initial slip amount on the basis of the detection result by the initial slip detecting unit 231. For example, the initial slip amount calculating unit 233 calculates an amount of change (difference) of the center of pressure as the fingertip shearing displacement amount $\Delta u_r$, and calculates an amount of change of the center of pressure in the rotation direction (angular direction) as the fingertip rotational displacement amount $\Delta u_{theta}$.

The fingertip rotational displacement amount $\Delta u_{theta}$ is calculated, for example, on the basis of an amount of relative change of a plurality of centers of pressure detected using a plurality of contact portions 23. Details of the calculation of the fingertip rotational displacement amount $\Delta u_{theta}$ will be described later.

Information indicating the initial slip amount including the fingertip shearing displacement amount $\Delta u_r$ and the fingertip rotational displacement amount $\Delta u_{theta}$ calculated by the initial slip amount calculating unit 233 is supplied to the tip position/posture calculating unit 234 and the gripping force calculating unit 235.

The tip position/posture calculating unit 234 applies the fingertip shearing displacement amount $\Delta u_r$ calculated by the initial slip amount calculating unit 233 to Equation (7) to calculate (estimate) the magnitude of the external force N. The tip position/posture calculating unit 234 estimates the direction of the external force N on the basis of the initial slip direction calculated by the initial slip direction calculating unit 232.

In addition, the tip position/posture calculating unit 234 applies the fingertip rotational displacement amount $\Delta u_{theta}$ calculated by the initial slip amount calculating unit 233 to Equation (8) to calculate the magnitude of the external moment $Nl_2$. The tip position/posture calculating unit 234 estimates the direction of the external moment $Nl_2$ on the basis of the direction of the initial slip calculated by the initial slip direction calculating unit 232.

The tip position/posture calculating unit 234 functions as an estimation unit that estimates the magnitude and direction of the external force N and the magnitude and direction of the external moment $Nl_2$.

The tip position/posture calculating unit 234 calculates the position and posture of the fingertip portion 31 on the basis of the estimated external force N and external moment $Nl_2$. For example, the tip position/posture calculating unit 234 calculates the position and posture of the fingertip portion 31 by which the balance between the external force N and the force generated by the robot 41 is maintained and the balance between the external moment $Nl_2$ and the moment generated by the robot 41 is maintained. Information regarding the position and posture of the fingertip portion 31 calculated by the tip position/posture calculating unit 234 is supplied to the arm control unit 241.

Here, the position and posture of the fingertip portion 31 corresponding to the tip of the robot 41 are controlled. However, the position and posture of the finger unit 12 or the position and posture of the hand portion 1 may be controlled instead of the position and posture of the fingertip portion 31, or the positions and postures of the finger unit 12 and the hand portion 1 may be controlled together with the position and posture of the fingertip portion 31.

Similar to the tip position/posture calculating unit 234, the gripping force calculating unit 235 calculates the magnitude of the external force N and the magnitude of the external moment $Nl_2$ on the basis of the fingertip shearing displacement amount $\Delta u_r$ and the fingertip rotational displacement amount $\Delta u_{theta}$ calculated by the initial slip amount calculating unit 233.

The gripping force calculating unit 235 calculates the gripping force $f_{nR}$ of the hand portion 1 on the basis of the estimated external force N and external moment $Nl_2$. For example, the gripping force calculating unit 235 calculates the gripping force $f_{nR}$ of the hand portion 1 by which the balance between the external force N and the force generated by the robot 41 is maintained and the balance between the external moment $Nl_2$ and the moment generated by the robot 41 is maintained.

The gripping force $f_{nR}$ by which the balance between the external force N and the force generated by the robot 41 is maintained is calculated, for example, so as to cancel the estimated external force N, that is, so as to make the observed fingertip shearing displacement amount $\Delta u_r$ zero. In addition, the gripping force $f_{nR}$ by which the balance between the external moment $Nl_2$ and the force generated by the robot 41 is maintained is calculated, for example, so as to cancel the estimated external force $Nl_2$, that is, so as to make the observed fingertip rotational displacement amount $\Delta u_{theta}$ zero. Information regarding the gripping force $f_{nR}$ estimated by the gripping force calculating unit 235 is supplied to the hand control unit 242.

The control unit 213 includes the arm control unit 241 and the hand control unit 242.

The arm control unit 241 controls the arm portion 2 according to a plan created by the operation planning unit 224. Under the control of the arm control unit 241, the arm portion 2 moves to the vicinity of the placement position for the gripped object. In addition, the arm control unit 241 controls the arm portion 2 according to an arm control algorithm.

For example, the arm control unit 241 controls the arm portion 2 such that the fingertip portion 31 has the position and posture calculated by the tip position/posture calculating unit 234. The position and posture of the fingertip portion 31 is adjusted using the arm control algorithm so as to cancel the initial slip generated by the external force and the external moment, that is, so that the initial slip amount becomes zero. At least one of the position or the posture may be adjusted.

The hand control unit 242 controls the gripping force $f_{nR}$ of the hand portion 1 in accordance with a gripping force control algorithm. The hand control unit 242 controls the hand portion 1 to grip the gripped object with the gripping force $f_{nR}$ calculated by the gripping force calculating unit 235.

Operation of Information Processing Device

Figure 10:
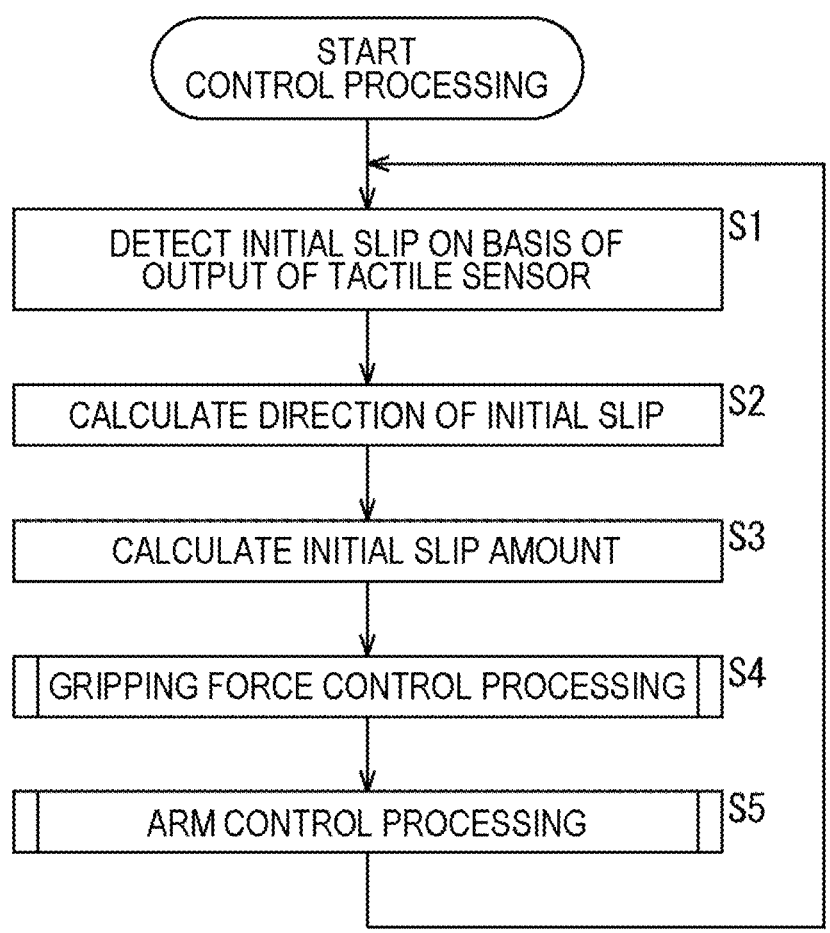
FIG. 10 is a flowchart for describing gripping force control and arm control processing.

Gripping force control and arm control processing will be described with reference to the flowchart of FIG. 10.

In step S1, the initial slip detecting unit 231 detects the movement of the center of pressure as the initial slip on the basis of the output of the tactile sensor 24.

In step S2, the initial slip direction calculating unit 232 calculates the direction of the initial slip on the basis of the direction of movement of the center of pressure.

In step S3, the initial slip amount calculating unit 233 calculates an initial slip amount. For example, an amount of change of the center of pressure is calculated as the fingertip shearing displacement amount $\Delta u_r$, and an amount of change of the center of pressure in the rotation direction is calculated as the fingertip rotational displacement amount $\Delta u_{theta}$.

In step S4, gripping force control processing is performed. The gripping force $f_{nR}$ of the hand portion 1 is controlled according to the gripping force control algorithm with the gripping force control processing. The gripping force control processing will be described later in detail with reference to the flowchart of FIG. 11.

In step S5, arm control processing is performed. Due to the arm control processing, the operation of the arm portion 2 is controlled according to the arm control algorithm, and the position and posture of the fingertip portion 31 are adjusted. The arm control processing will be described later in detail with reference to the flowchart of FIG. 12.

Figure 11:
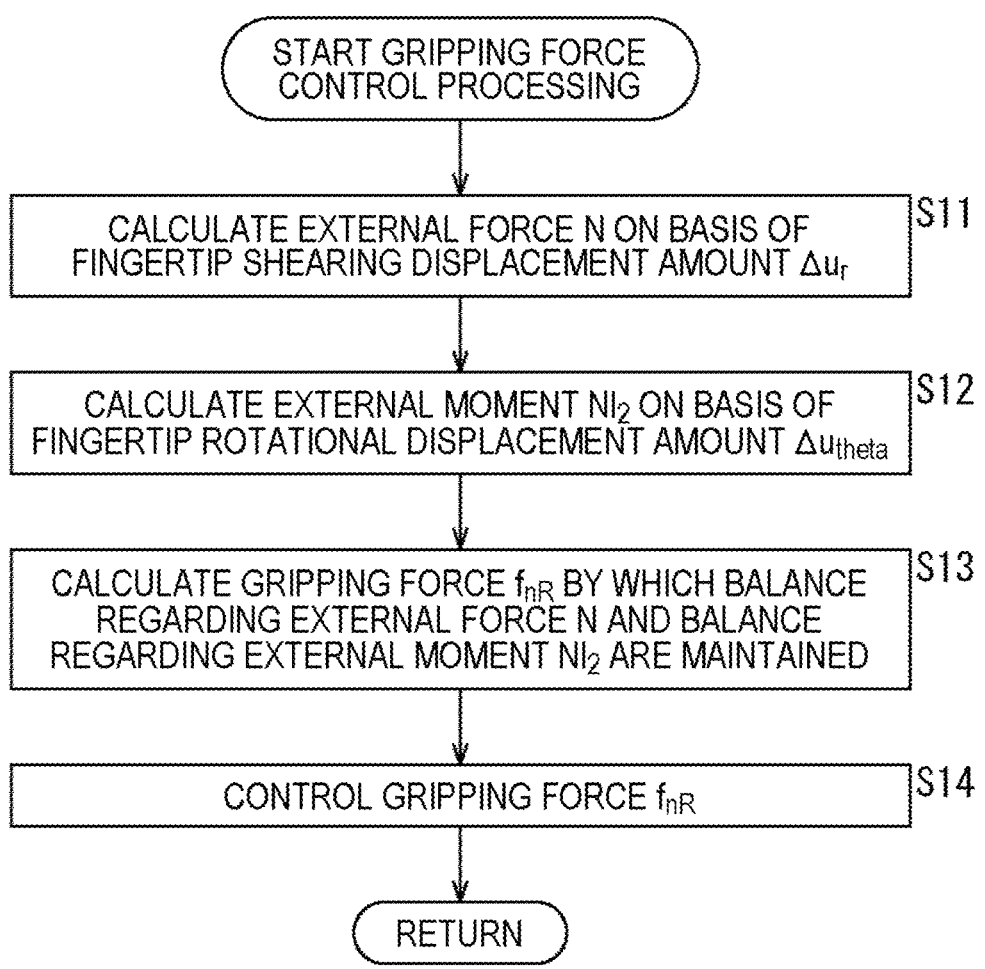
FIG. 11 is a flowchart illustrating gripping force control processing performed in step S4 in FIG. 10.

Next, the gripping force control processing performed in step S4 in FIG. 10 will be described with reference to the flowchart in FIG. 11.

In step S11, the gripping force calculating unit 235 applies the fingertip shearing displacement amount Aur calculated by the initial slip amount calculating unit 233 to Equation (7) to calculate the magnitude of the external force N.

In step S12, the gripping force calculating unit 235 applies the fingertip rotational displacement amount $\Delta u_{theta}$ calculated by the initial slip amount calculating unit 233 to Equation (8) to calculate the magnitude of the external moment $Nl_2$.

In step S13, the gripping force calculating unit 235 calculates the gripping force $f_{nR}$ of the hand portion 1 by which the balance between the external force N and the force generated by the robot 41 is maintained and the balance between the external moment $Nl_2$ and the moment generated by the robot 41 is maintained.

In step S14, the hand control unit 242 controls the hand portion 1 to grip the gripped object with the gripping force $f_{nR}$ calculated by the gripping force calculating unit 235. Thereafter, the processing returns to step S4 in FIG. 10, and the subsequent processes are performed.

Figure 12:
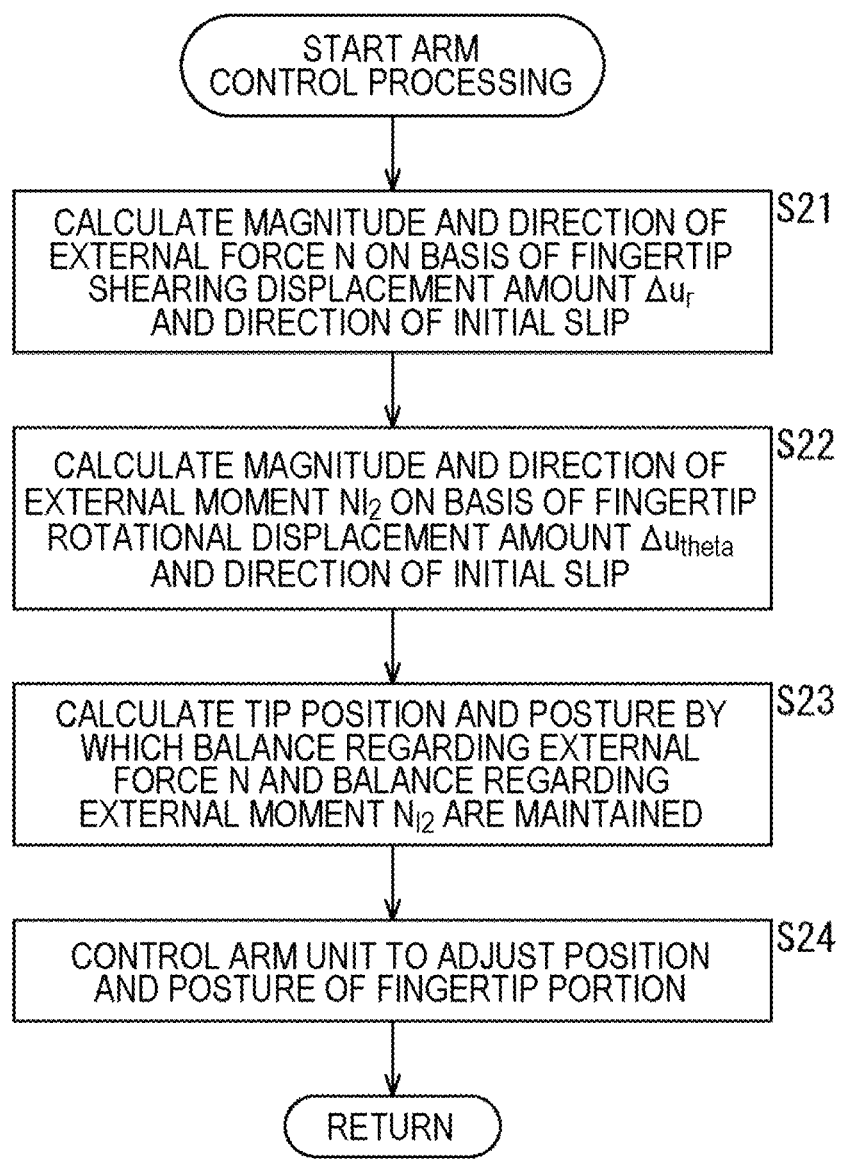
FIG. 12 is a flowchart illustrating arm control processing performed in step S5 in FIG. 10.

Next, the arm control processing performed in step S5 in FIG. 10 will be described with reference to the flowchart in FIG. 12.

In step S21, the tip position/posture calculating unit 234 applies the fingertip shearing displacement amount $\Delta u_r$ calculated by the initial slip amount calculating unit 233 to Equation (7) to calculate the magnitude of the external force N. In addition, the tip position/posture calculating unit 234 estimates the direction of the external force N on the basis of the initial slip direction calculated by the initial slip direction calculating unit 232.

In step S22, the tip position/posture calculating unit 234 applies the fingertip rotational displacement amount $\Delta u_{theta}$ calculated by the initial slip amount calculating unit 233 to Equation (8) to calculate the magnitude of the external moment $Nl_2$. In addition, the tip position/posture calculating unit 234 calculates the direction of the external moment $Nl_2$ on the basis of the direction of the initial slip calculated by the initial slip direction calculating unit 232.

In step S23, the tip position/posture calculating unit 234 calculates the position and posture of the fingertip portion 31 by which the balance between the external force N and the force generated by the robot 41 is maintained and the balance between the external moment $Nl_2$ and the moment generated by the robot 41 is maintained.

In step S24, the arm control unit 241 controls the arm portion 2 such that the fingertip portion 31 has the position and posture calculated by the tip position/posture calculating unit 234. Thereafter, the processing returns to step S5 in FIG. 10, and the subsequent processes are performed.

As described above, the robot 41 can detect a minute change in the external force by using the tactile sensor 24 provided on the fingertip portion 31. Furthermore, the robot 41 can place the object even in a case where the placement operation is difficult such as a case where the gripped object is soft or a case where the location where the gripped object is to be placed has a soft environment.

The robot 41 can stably place the unknown object by simultaneously performing the gripping force control and the arm control such that the balance between forces and balance between moments are maintained using the information regarding the slip detected by the tactile sensor 24.

It is possible to prevent the robot 41 from breaking the object due to application of an excessive force to the gripped object or dropping the object due to application of a too small force during the placement operation by the gripping force control performed so that the balance between forces and the balance between moments are maintained.

That is, the robot 41 can more stably place the gripped object.

Calculation of Fingertip Rotational Displacement Amount $\Delta u_{theta}$

The fingertip rotational displacement amount $\Delta u_{theta}$ is expressed by an amount of change of the center of pressure in the rotation direction as described above. For example, the fingertip rotational displacement amount $\Delta u_{theta}$ is calculated as follows.

Figure 13:
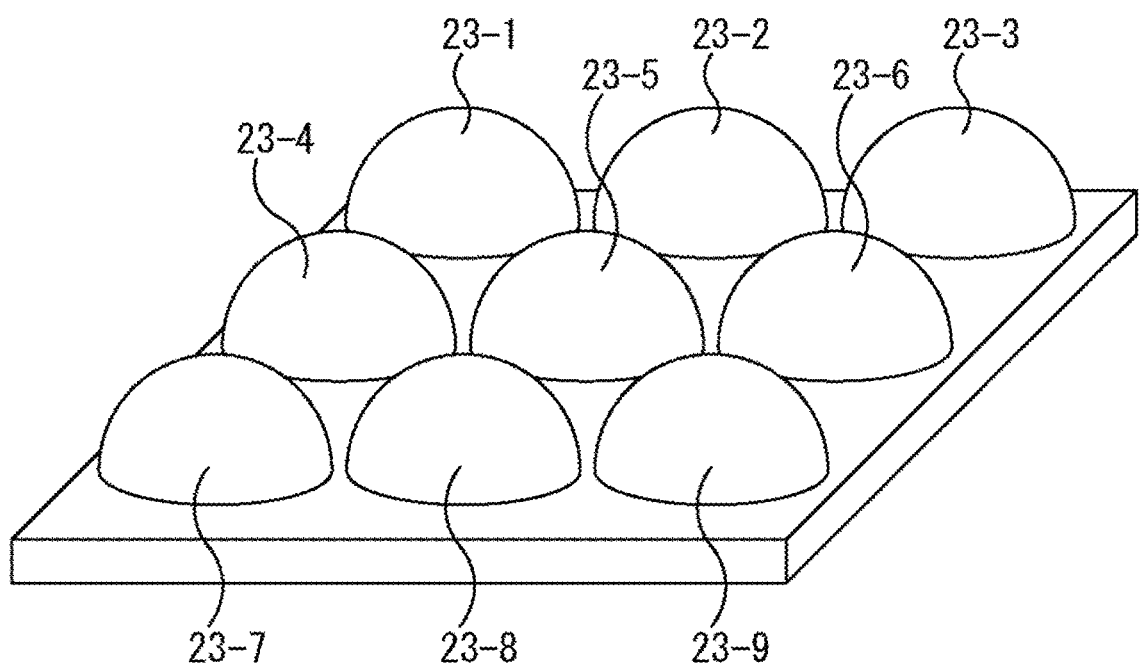
FIG. 13 is a diagram illustrating an arrangement example of a contact portion.

FIG. 13 is a diagram illustrating an arrangement example of the contact portion 23.

As illustrated in FIG. 13, a plurality of contact portions 23 is arranged on an inner surface of the fingertip portion 31 which is a contact surface with the gripped object. In the example of FIG. 13, nine contact portions 23 which are contact portions 23-1 to 23-9 are arranged. The tactile sensor 24 is provided below the contact portions 23-1 to 23-9. A pressure distribution at a position corresponding to each of the contact portions 23-1 to 23-9 is detected by the tactile sensor 24.

Due to the plurality of contact portions 23 being arranged as described above, a plurality of centers of pressure corresponding to the number of contact portions 23 can be detected. The fingertip rotational displacement amount $\Delta u_{theta}$ is calculated on the basis of an amount of relative movement of the plurality of centers of pressure.

Figure 14:
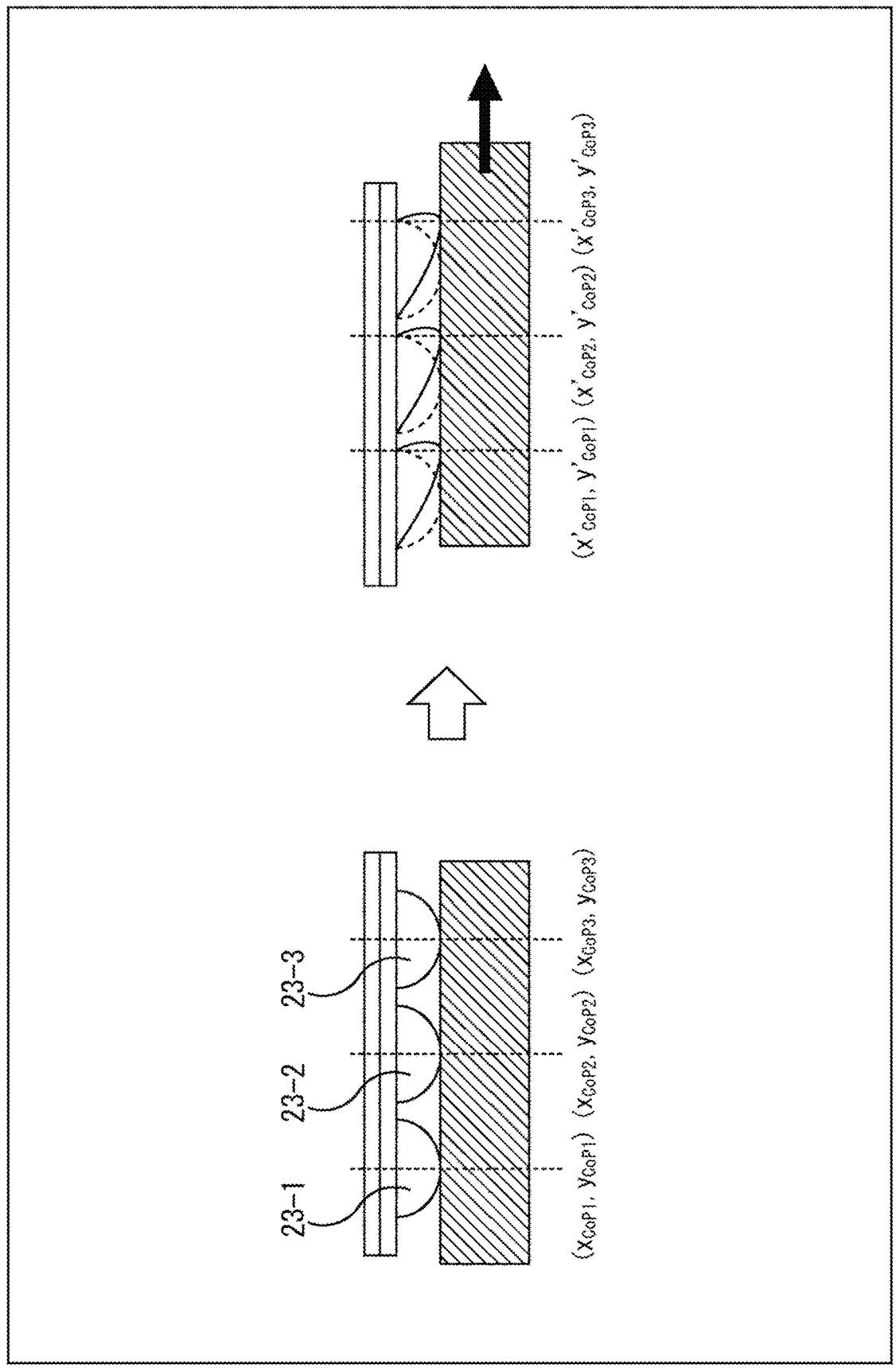
FIG. 14 is a diagram illustrating a change in the state of the contact portion.

FIG. 14 is a diagram illustrating a change in the state of the contact portion 23.

The left diagram of FIG. 14 illustrates a state of the contact portion 23 before an external force acts, and the right diagram of FIG. 14 illustrates a state of the contact portion 23 on which the external force acts. FIG. 14 illustrates states of the contact portions 23-1 to 23-3. ($x_{copi}$, $y_{copi}$) represents the position of the center of pressure of the contact portion 23-$i$ (i=1 to 9) in the X direction and the Y direction before rotation. ($x'_{copi}$, $y'_{copi}$) represents the position of the center of pressure of the contact portion 23-$i$ in the X direction and the Y direction after rotation.

The relationship between the centers of pressure before and after rotation and the fingertip rotational displacement amount $\Delta u_{theta}$ is expressed by Equation (10) using an affine transformation. The fingertip rotational displacement amount $\Delta u_{theta}$ is expressed by a matrix having three rows and three columns on the left side of Equation (10).

[Equation 10]

$$\begin{pmatrix} \cos(\Delta u_{theta}) & -\sin(\Delta u_{theta}) & \Delta ux \\ \sin(\Delta u_{theta}) & \cos(\Delta u_{theta}) & \Delta uy \\ 0 & 0 & 1 \end{pmatrix} \begin{pmatrix} x_{CoPi} \\ y_{CoPi} \\ 1 \end{pmatrix} = \begin{pmatrix} x'_{CoPi} \\ y'_{CoPi} \\ 1 \end{pmatrix} \quad (10)$$

For example, focusing on each contact portion 23, the same number of relationships represented by Equation (10) as the number of contact portions 23 are obtained. The fingertip rotational displacement amount $\Delta u_{theta}$ is obtained by approximating the fingertip rotational displacement amount $\Delta u_{theta}$ when each contact portion 23 is focused using least-square method or the like.

Note that, in Equation (10), $\Delta u_x$ represents an amount of change of the position of the center of pressure in the X direction. $\Delta u_y$ represents an amount of change of the position of the center of pressure in the Y direction.

Modification

In a Case Where the Gripping Posture Changes

Figure 15:
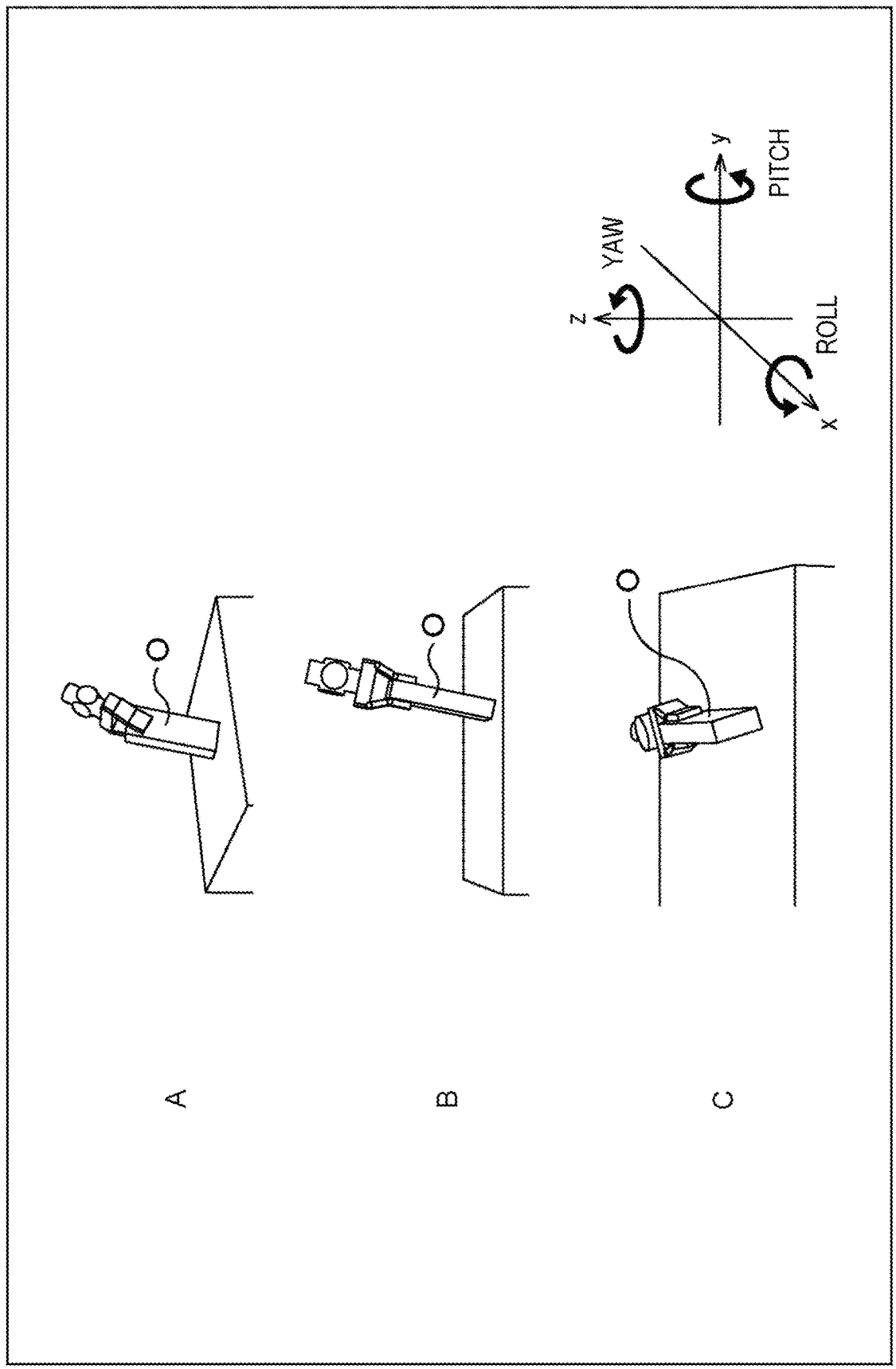
FIG. 15 is a diagram illustrating an example of a change in a gripping posture.

FIG. 15 is a diagram illustrating an example of a change in a gripping posture.

A, B, and C of FIG. 15 illustrate changes in the gripping posture in the directions of a pitch axis, a roll axis, and a yaw axis, respectively. The gripping posture may change as illustrated in FIG. 15 due to the contact with the floor surface.

The robot 41 calculates the initial slip direction and the total pressure value on the basis of the detection results of the tactile sensors 24 provided at the fingertip portions 31 of the finger unit 12A serving as the left finger and the finger unit 12B serving as the right finger. The total pressure value indicates a total value of pressures detected at each position of the tactile sensor 24.

In addition, the rotation axis of the inclination of the gripped object with respect to the floor surface (the rotation axis of the inclination of the gripping posture of the fingertip portion 31) is calculated on the basis of the relationship between the initial slip direction and the total pressure value.

The arm portion 2 is controlled so as to cancel the inclination of the gripped object with respect to the floor surface and the posture of the fingertip portion 31 is adjusted, whereby the object O can be placed with the posture of the object O being adjusted.

Figure 16:
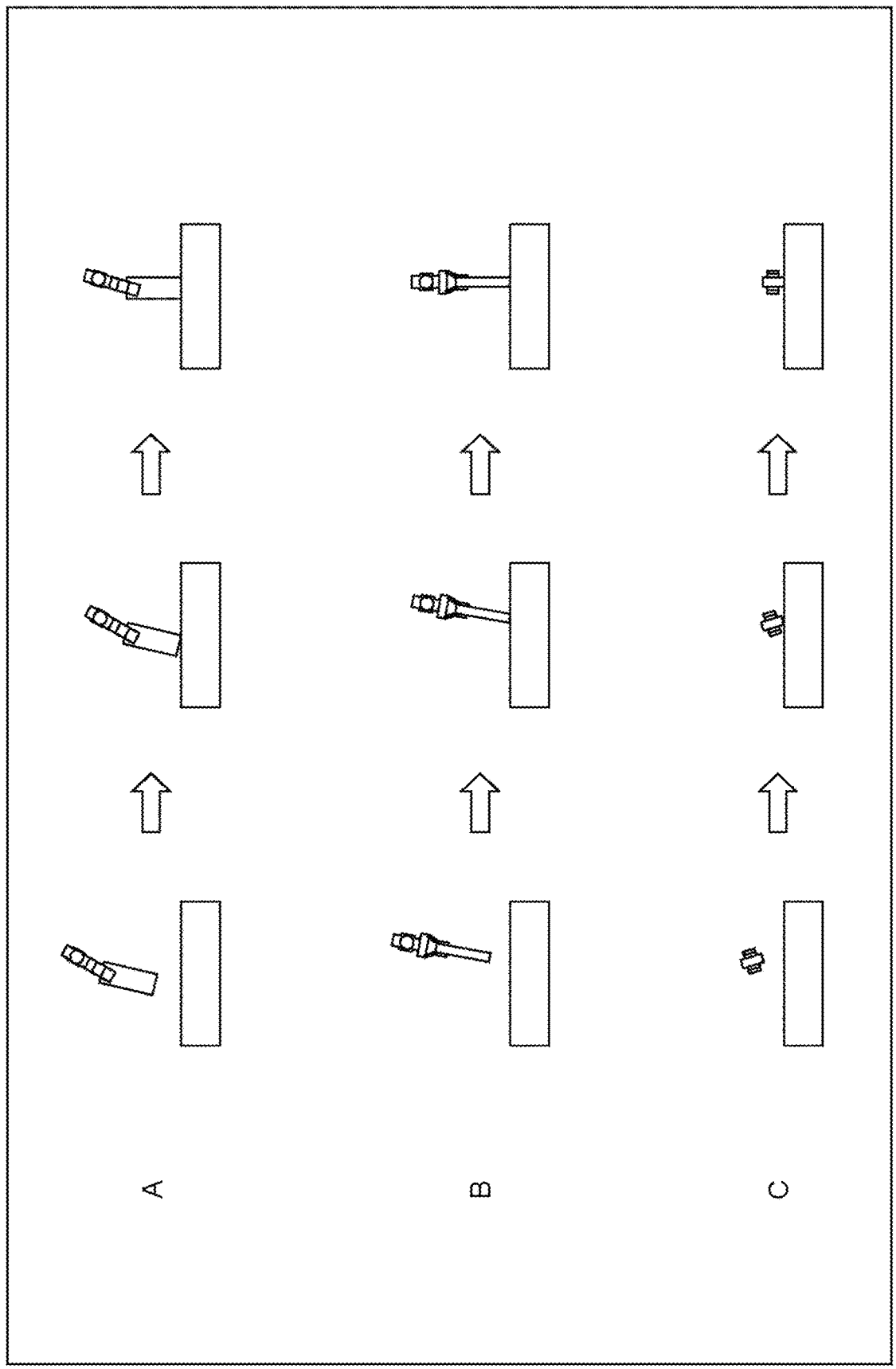
FIG. 16 is a diagram illustrating an example of adjustment of the gripping posture.

FIG. 16 is a diagram illustrating an example of adjustment of the gripping posture.

In a case where the gripped object is inclined in the pitch axis direction, the posture of the object O is adjusted by adjusting the posture of the fingertip portion 31 in the pitch axis direction as illustrated in A of FIG. 16. Similarly, in a case where the gripped object is inclined in the roll axis direction and the yaw axis direction, the posture of the object O is adjusted by adjusting the posture of the fingertip portion 31 in the roll axis direction and the yaw axis direction as illustrated in B and C of FIG. 16.

Figure 17:
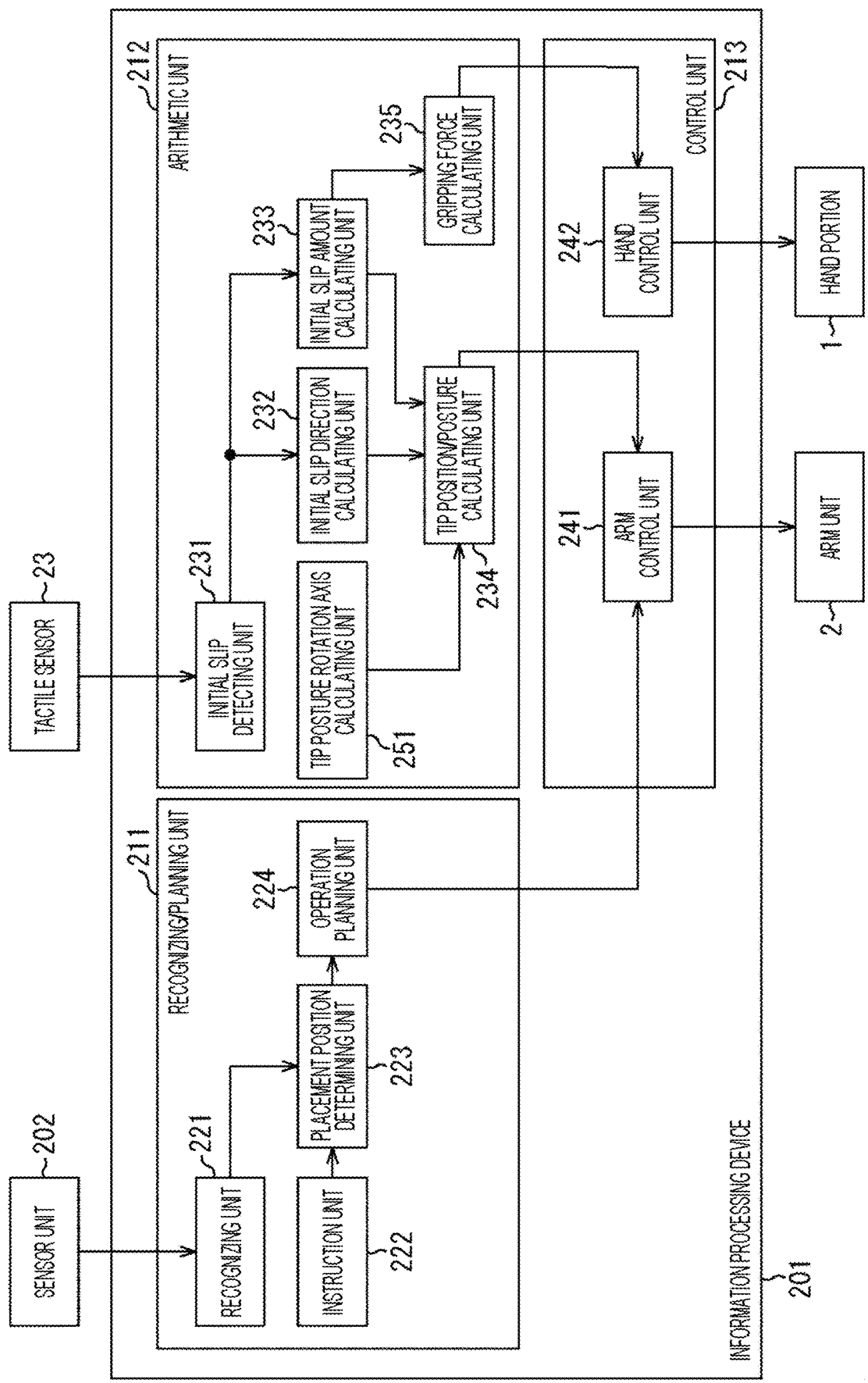
FIG. 17 is a block diagram illustrating another configuration example of the information processing device.

FIG. 17 is a block diagram illustrating another configuration example of the information processing device 201.

In FIG. 17, the same components as those described with reference to FIG. 9 are denoted by the same reference signs. The overlapping description will be omitted as appropriate. The configuration of the information processing device 201 illustrated in FIG. 17 is the same as the configuration described with reference to FIG. 9 except that a tip posture rotation axis calculating unit 251 is additionally provided.

The tip posture rotation axis calculating unit 251 calculates the rotation axis of the inclination of the posture of the fingertip portion 31, and outputs information indicating the rotation axis of the inclination to the tip position/posture calculating unit 234.

The tip position/posture calculating unit 234 calculates the position and posture of the fingertip portion 31 so as to cancel the change in position and posture due to the initial slip in consideration of the rotation axis of the inclination calculated by the tip posture rotation axis calculating unit 251.

The arm control unit 241 controls the arm portion 2 such that the fingertip portion 31 has the position and posture calculated by the tip position/posture calculating unit 234. The arm portion 2 is controlled such that the position and posture of the fingertip portion 31 are adjusted in the direction of the rotation axis calculated by the tip posture rotation axis calculating unit 251.

Figure 18:
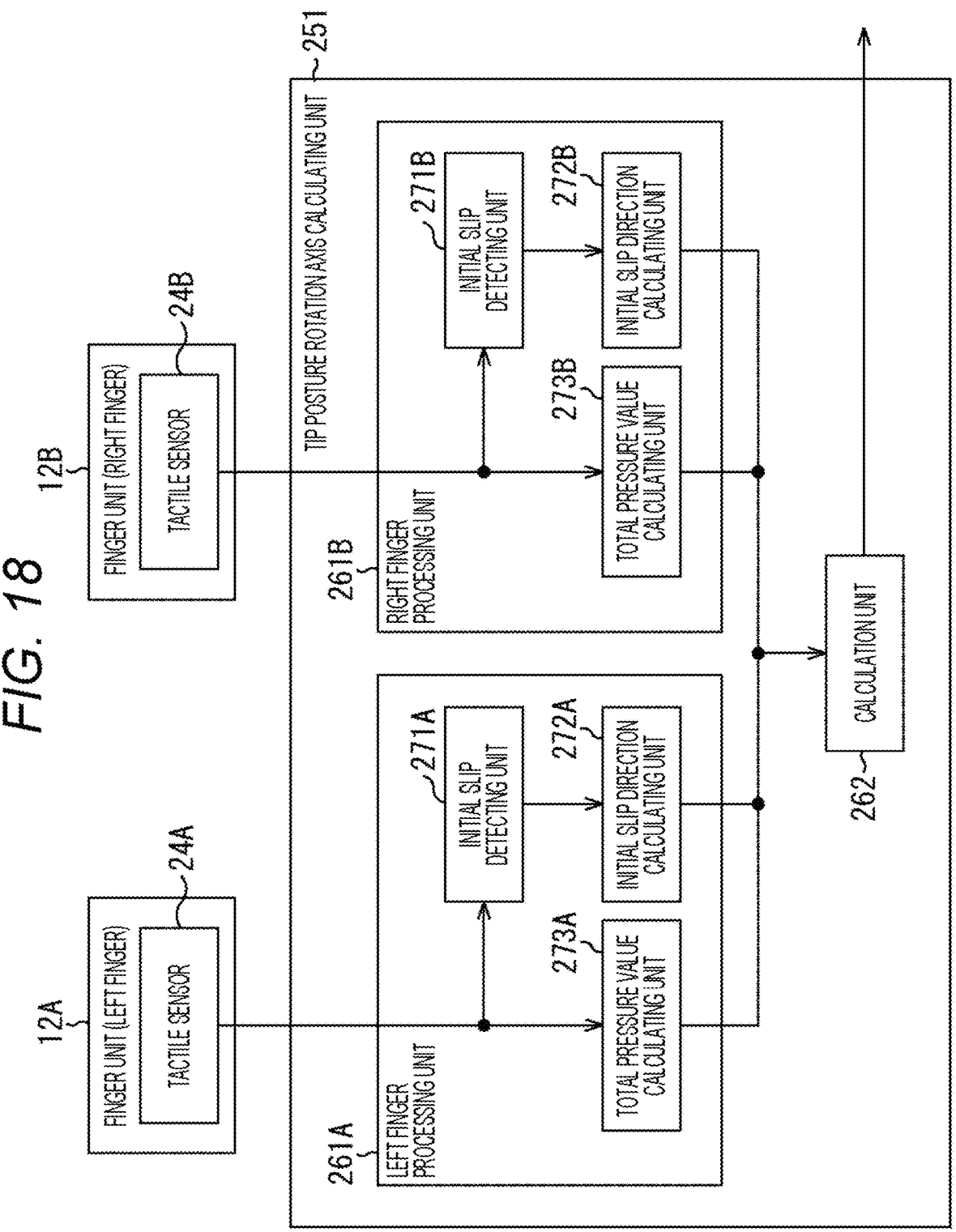
FIG. 18 is a block diagram illustrating a configuration example of a tip posture rotation axis calculating unit.

FIG. 18 is a block diagram illustrating a configuration example of the tip posture rotation axis calculating unit 251.

As illustrated in FIG. 18, the tip posture rotation axis calculating unit 251 includes a left finger processing unit 261A, a right finger processing unit 261B, and a calculation unit 262.

The left finger processing unit 261A includes an initial slip detecting unit 271A, an initial slip direction calculating unit 272A, and a total pressure value calculating unit 273A. Sensor data representing the pressure distribution detected by the tactile sensor 24A provided in the finger unit 12A serving as the left finger is supplied to the initial slip detecting unit 271A and the total pressure value calculating unit 273A.

The initial slip detecting unit 271A detects the initial slip by calculating an amount of movement of the center of pressure on the basis of the detection result of the pressure distribution by the tactile sensor 24A. The detection result by the initial slip detecting unit 271A is supplied to the initial slip direction calculating unit 272A.

The initial slip direction calculating unit 272A calculates the direction of the change in the center of pressure as the direction of the initial slip on the basis of the detection result by the initial slip detecting unit 271A, and outputs information indicating the direction of the initial slip to the calculation unit 262.

The total pressure value calculating unit 273A calculates the total of the pressures at the respective positions by the tactile sensor 24A on the basis of the detection result of the pressure distribution by the tactile sensor 24A, and outputs information indicating the total value of the pressures to the calculation unit 262.

On the other hand, the right finger processing unit 261B includes an initial slip detecting unit 271B, an initial slip direction calculating unit 272B, and a total pressure value calculating unit 273B. The right finger processing unit 261B performs processing similar to the processing performed in the left finger processing unit 261A on the basis of sensor data indicating a pressure distribution detected by the tactile sensor 24B provided in the finger unit 12B serving as the right finger.

That is, the initial slip detecting unit 271B detects the initial slip by calculating an amount of movement of the center of pressure on the basis of the detection result of the pressure distribution by the tactile sensor 24B. The detection result by the initial slip detecting unit 271B is supplied to the initial slip direction calculating unit 272B.

The initial slip direction calculating unit 272B calculates the direction of the change in the center of pressure as the direction of the initial slip on the basis of the detection result by the initial slip detecting unit 271B, and outputs information indicating the direction of the initial slip to the calculation unit 262.

The total pressure value calculating unit 273B calculates the total of the pressures at the respective positions by the tactile sensor 24B on the basis of the detection result of the pressure distribution by the tactile sensor 24B, and outputs information indicating the total value of the pressures to the calculation unit 262.

The initial slip detecting unit 271A and the initial slip detecting unit 271B can be implemented by the initial slip detecting unit 231 in FIG. 17. In addition, the initial slip direction calculating unit 272A and the initial slip direction calculating unit 272B can be implemented by the initial slip direction calculating unit 232 in FIG. 17.

The calculation unit 262 calculates the rotation axis of the inclination of the posture of the fingertip portion 31 on the basis of the difference between the total value of the pressures calculated by the total pressure value calculating unit 273A and the total value of the pressures calculated by the total pressure value calculating unit 273B.

When the rotation axis is calculated, the initial slip directions calculated by the initial slip direction calculating unit 272A and the initial slip direction calculating unit 272B are also considered. By considering the initial slip directions, the direction of the rotational force generated by the gripped object with respect to the fingertip portion 31 due to the contact with the floor surface, that is, the rotation axis, is calculated. Information indicating the rotation axis of the inclination of the posture of the fingertip portion 31 calculated by the calculation unit 262 is output to the tip position/posture calculating unit 234.

In this manner, the rotation axis of the inclination of the posture of the fingertip portion 31 is calculated, and the arm control is performed so that the inclination of the posture is canceled and the balance regarding forces and the balance regarding moments are maintained as described above. Even in a case where the gripping state is changed by rotation due to deviation in gravity center or the like, the robot 41 can adjust the posture of the object and place the object.

Note that the arm control based on the rotation axis of the inclination of the posture of the fingertip portion 31 can be applied not only to a task of placing the gripped object but also to other tasks such as a task of erasing characters written on a whiteboard using a cleaner.

In a Case of Multiple Fingers

In a case where the hand portion 1 has multiple finger units such as three or more finger units, posture information of each finger unit may be used to calculate the rotation axis of the inclination of the posture of the fingertip portion 31.

Figure 19:
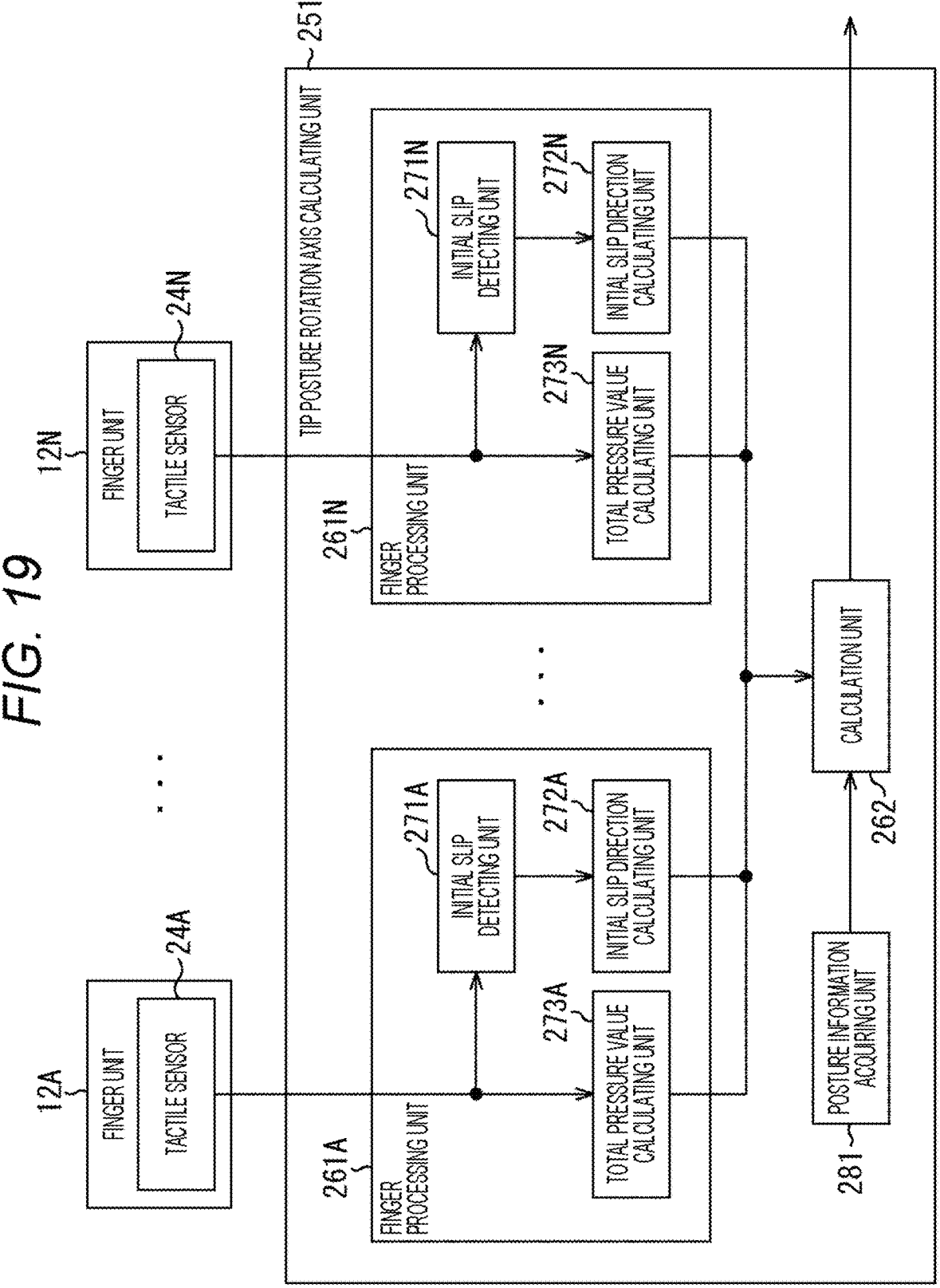
FIG. 19 is a block diagram illustrating another configuration example of the tip posture rotation axis calculating unit.

FIG. 19 is a block diagram illustrating another configuration example of the tip posture rotation axis calculating unit 251.

The configuration of the tip posture rotation axis calculating unit 251 illustrated in FIG. 19 is the same as the configuration described with reference to FIG. 18 except that the same number of finger processing units 261 as the finger units 12 are provided, and that a posture information acquiring unit 281 is additionally provided.

The posture information acquiring unit 281 calculates the posture of each finger on the basis of an output of an encoder provided at a joint or the like that is a movable part of each finger, and outputs information indicating the posture of each finger to the calculation unit 262. The encoder provided at a joint or the like of each finger outputs information indicating an amount of movement of the joint.

The calculation unit 262 calculates the rotation axis of the inclination of the gripped object with respect to the floor surface by considering the posture information of each finger in addition to the relationship between the initial slip direction and the total pressure value calculated on the basis of the detection result of the tactile sensor 24 of each finger. Information indicating the rotation axis of the inclination of the posture of the fingertip portion 31 calculated by the calculation unit 262 is output to the tip position/posture calculating unit 234.

By calculating the rotation axis of the inclination of the gripped object in consideration of the posture information of each finger, it is possible to improve the accuracy of the calculation of the rotation axis as compared with the case of calculating the rotation axis of the inclination of the gripped object only on the basis of the relationship between the initial slip direction and the total pressure value.

Other Examples

Examples of Sensor

Although the initial slip is detected on the basis of the pressure distribution detected by the pressure distribution sensor, the initial slip may be detected using an optical sensor such as an RGB camera or a ToF sensor together with the pressure distribution sensor. In a case where the optical sensor is used together, the shift of each position of the contact portion 23 which is an elastic body is measured by the optical sensor, for example.

The initial slip may be detected using a force sensor together with the pressure distribution sensor. In a case where the force sensor is used together, it is detected that the initial slip has occurred when, for example, the magnitude of the force applied to the contact portion 23 reaches a magnitude set in advance as the magnitude of the force at the time of occurrence of the initial slip.

When the arm portion 2 is controlled using the arm control algorithm, operation plan information indicating the operation of the arm portion 2 may be used.

System Configuration

Figure 20:
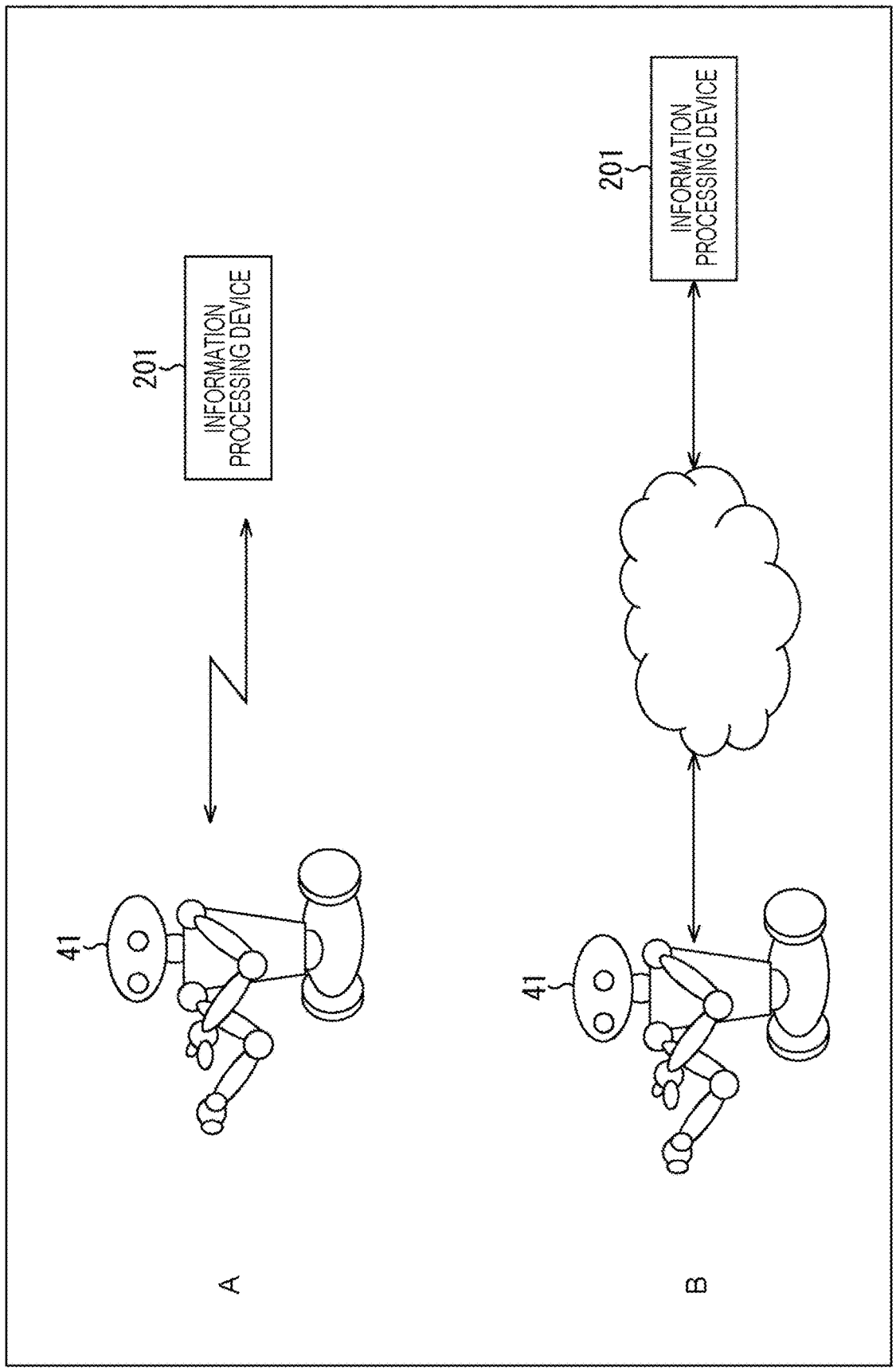
FIG. 20 is a block diagram illustrating a configuration example of a control system.

FIG. 20 is a diagram illustrating a configuration example of a control system.

The control system illustrated in FIG. 20 is configured by providing the information processing device 201 as a device outside the robot 41. In this manner, the information processing device 201 may be provided outside the housing of the robot 41.

Wireless communication using a wireless LAN, wireless communication using a mobile communication system, or the like is performed between the robot 41 and the information processing device 201 in FIG. 20.

Various types of information such as information indicating a state of the robot 41 and information indicating a detection result of sensors are transmitted from the robot 41 to the information processing device 201. Information for controlling the operation of the robot 41 and the like are transmitted from the information processing device 201 to the robot 41.

The robot 41 and the information processing device 201 may be directly connected as illustrated in A of FIG. 20, or may be connected via a network such as the Internet as illustrated in B of FIG. 20. The operations of a plurality of robots 41 may be controlled by one information processing device 201.

Computer

The series of processing described above can be executed by hardware or by software. In a case where the series of processing is executed by software, a program constituting the software is installed from a program recording medium to a computer incorporated in dedicated hardware, a general-purpose personal computer, or the like.

Figure 21:
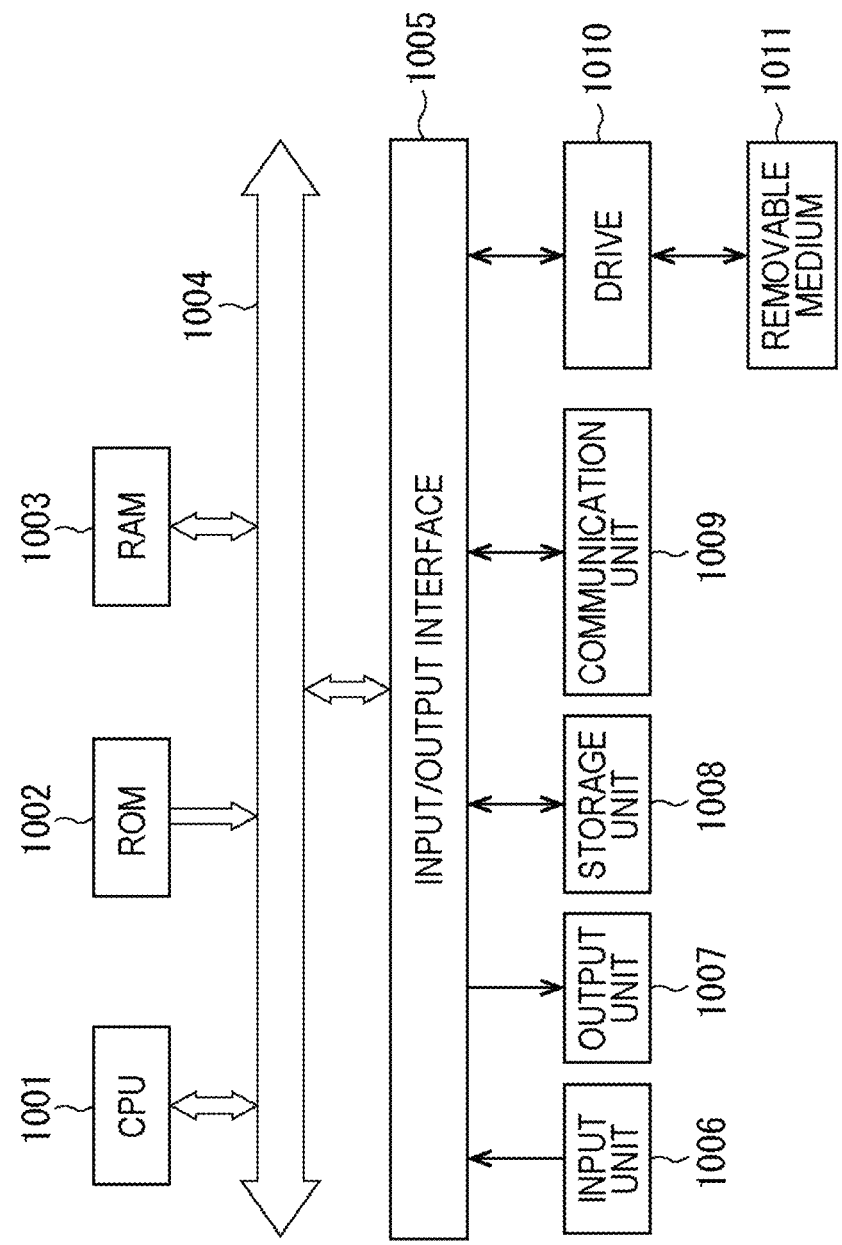
FIG. 21 is a block diagram illustrating a configuration example of a computer.

FIG. 21 is a block diagram illustrating a configuration example of the hardware of a computer that executes the abovementioned series of processing programmatically.

A central processing unit (CPU) 1001, a read only memory (ROM) 1002, and a random access memory (RAM) 1003 are connected to each other by a bus 1004.

An input/output interface 1005 is further connected to the bus 1004. An input unit 1006 including a keyboard, a mouse, and the like, and an output unit 1007 including a display, a speaker, and the like are connected to the input/output interface 1005. Furthermore, a storage unit 1008 including a hard disk, a nonvolatile memory, and the like, a communication unit 1009 including a network interface and the like, and a drive 1010 that drives a removable medium 1011 are connected to the input/output interface 1005.

In the computer configured as described above, the CPU 1001 loads the program stored in, for example, the storage unit 1008 into the RAM 1003 via the input/output interface 1005 and the bus 1004, and executes the program, whereby the series of processing described above is performed.

The program executed by the CPU 1001 is provided, for example, by being recorded in the removable medium 1011 or via a wired or wireless transmission medium such as a local area network, the Internet, or digital broadcasting, and is installed in the storage unit 1008.

Note that the program executed by the computer may be a program in which processes are carried out in a time series in the order described in this specification or may be a program in which processes are carried out in parallel or at necessary timings, such as when the processes are called.

In the present specification, a "system" means a set of a plurality of components (devices, modules (parts), etc.), and all components need not be necessarily in the same housing. Therefore, a plurality of devices housed in separate housings and connected via a network, and a single device in which a plurality of modules is housed in one housing are regarded as a system.

It should be noted that the effects described in the present specification are merely illustrative and not restrictive, and may have additional effects.

It should be noted that embodiments of the present technology are not limited to the abovementioned embodiment, and various modifications are possible without departing from the gist of the present technology.

For example, the present technology can employ, for example, a configuration of cloud computing in which one function is shared by a plurality of devices via a network and processed in cooperation with each other.

Further, steps described in the above-described flowcharts may be executed by a single device or shared and executed by a plurality of devices.

Further, in a case where multiple processes are included in one step, the multiple processes included in the one step may be executed by a single device or may be shared and executed by a plurality of devices.

Example of Combination of Configurations

It is to be noted that the present technology may also have the following configurations.

(1)

An information processing device including:
a slip detecting unit that detects a slip generated in an object gripped by a finger portion constituting a grip portion;
an estimation unit that estimates an external force and an external moment applied to the object on the basis of the slip generated in the object; and
an arm control unit that controls an operation of an arm portion on the basis of the estimated external force and external moment to adjust at least one of a position or a posture of the finger portion constituting the grip portion provided in the arm portion.

(2)

The information processing device according to (1), in which
the arm control unit controls the arm portion such that a balance between the estimated external force and a force generated in the object by the operation of the arm portion is maintained, and a balance between the estimated external moment and a moment generated in the object by the operation of the arm portion is maintained.

(3)

The information processing device according to (1) or (2), further including
a gripping force control unit that controls a gripping force of the grip portion on the basis of the estimated external force and external moment.

(4)

The information processing device according to (3), in which
the gripping force control unit controls the gripping force such that a balance between the estimated external force and a force generated in the object by gripping by the grip portion is maintained, and a balance between the estimated external moment and a moment generated in the object by gripping by the grip portion is maintained.

(5)

The information processing device according to any one of (1) to (4), in which
the finger portion includes:
an elastic body that comes into contact with the object when the object is gripped; and
a pressure distribution sensor that detects a distribution of pressure applied to the elastic body, and
the slip detecting unit detects an initial slip in which a fixed portion and a slip portion are mixed between the object and the elastic body on the basis of a detection result of the pressure distribution sensor.

(6)
The information processing device according to (5), in which
the estimation unit estimates directions and amounts of the external force and the external moment applied to the object on the basis of a direction and an amount of the initial slip.

(7)
The information processing device according to (6), in which
the slip detecting unit detects the initial slip on the basis of movement of a center of pressure.

(8)
The information processing device according to (7), further including:
an initial slip direction calculating unit that calculates a direction of the initial slip on the basis of a direction of movement of the center of pressure; and
an initial slip amount calculating unit that calculates an amount of the initial slip on the basis of the amount of movement of the center of pressure.

(9)
The information processing device according to any one of (1) to (8), in which
the slip detecting unit detects a slip generated in the object by a drag applied from a placement surface when the object is placed.

(10)
The information processing device according to any one of (5) to (9), in which
the slip detecting unit detects the initial slip on the basis of a deviation of each position of the elastic body detected by an optical sensor or on the basis of a magnitude of a force applied to the elastic body detected by a force sensor.

(11)
The information processing device according to any one of (5) to (10), in which
the grip portion is provided with a plurality of the finger portions, and
the slip detecting unit detects the initial slip at each of the finger portions on the basis of a detection result of the pressure distribution sensor.

(12)
The information processing device according to (11), further including
a calculation unit that calculates an inclination of the finger portion gripping the object on the basis of a direction of the initial slip and a force detected by the pressure distribution sensor of each of the finger portions, in which
the arm control unit controls an operation of the arm portion on the basis of the calculated inclination.

(13)
The information processing device according to (12), in which
the calculation unit calculates the inclination of the finger portion on the basis of posture information indicating an amount of movement of a movable part of each of the finger portions.

(14)
An information processing method performed by an information processing device, the method including:
detecting a slip generated in an object gripped by a finger portion constituting a grip portion;
estimating an external force and an external moment applied to the object on the basis of the slip generated in the object; and
controlling an operation of an arm portion on the basis of the estimated external force and external moment to adjust at least one of a position or a posture of the finger portion constituting the grip portion provided in the arm portion.

(15)
A program causing a computer to execute:
detecting a slip generated in an object gripped by a finger portion constituting a grip portion;
estimating an external force and an external moment applied to the object on the basis of the slip generated in the object; and
controlling an operation of an arm portion on the basis of the estimated external force and external moment to adjust at least one of a position or a posture of the finger portion constituting the grip portion provided in the arm portion.

REFERENCE SIGNS LIST

1 Hand portion
2L, 2R Arm portion
11 Base
12A, 12B Finger unit
23A, 23B Contact portion
24A, 24B Tactile sensor
31A, 31B Fingertip portion
41 Robot
201 Information processing device
202 Sensor unit
211 Recognizing/planning unit
212 Arithmetic unit
213 Control unit
221 Recognizing unit
222 Instruction unit
223 Placement position determining unit
224 Operation planning unit
231 Initial slip detecting unit
232 Initial slip direction calculating unit
233 Initial slip amount calculating unit
234 Tip position/posture calculating unit
235 Gripping force calculating unit
241 Arm control unit
242 Hand control unit
251 Tip posture rotation axis calculating unit
261A Left finger processing unit
261B Right finger processing unit
262 Calculation unit
271A, 271B Initial slip detecting unit
272A, 272B Initial slip direction calculating unit
273A, 273B Total pressure value calculating unit
281 Posture information acquiring unit

The invention claimed is:
1. An information processing device comprising:
circuitry including a CPU that is configured by execution of computer readable instructions to
detect a slip generated in an object gripped by a finger portion constituting a grip portion that is provided on an arm portion;
estimate an external force and an external moment applied to the object on a basis of the slip generated in the object; and
control an operation of the arm portion on a basis of the external force and the external moment to adjust at least one of a position and a posture of the finger portion constituting the grip portion, wherein the finger portion includes an elastic body that comes into contact with the object when the object is gripped, and a pressure distribution sensor that detects a distribution of pressure applied to the elastic body, and the circuitry is further configured to detect an initial slip in which a fixed portion and a slip portion are mixed between the object and the elastic body on a basis of a detection result of the pressure distribution sensor, and estimate directions and amounts of the external force and the external moment applied to the object on a basis of a direction and an amount of the initial slip.

2. The information processing device according to claim 1, wherein the circuitry is further configured to control the arm portion such that a balance between the external force and a force generated on the object by the operation of the arm portion is maintained, and a balance between the external moment and a moment generated on the object by the operation of the arm portion is maintained.

3. The information processing device according to claim 1, wherein the circuitry is further configured to control a gripping force of the grip portion on a basis of the external force and the external moment.

4. The information processing device according to claim 3, wherein the circuitry is further configured to control the gripping force such that a balance between the external force and a force generated on the object by gripping by the grip portion is maintained, and a balance between the external moment and a moment generated on the object by gripping by the grip portion is maintained.

5. The information processing device according to claim 1, wherein the circuitry is further configured to detect a slip generated in the object by a drag applied from a placement surface on which the object is placed.

6. The information processing device according to claim 1, wherein the circuitry is further configured to detect the initial slip on a basis of movement of a center of pressure.

7. The information processing device according to claim 6, wherein the circuitry is further configured to calculate a direction of the initial slip on a basis of a direction of movement of the center of pressure and an amount of the initial slip on a basis of an amount of the movement of the center of pressure.

8. The information processing device according to claim 1, wherein the circuitry is further configured to detect the initial slip on a basis of a deviation of each position of the elastic body detected by an optical sensor or on a basis of a magnitude of a force applied to the elastic body detected by a force sensor.

9. The information processing device according to claim 1, wherein the grip portion is provided with a plurality of finger portions, and the circuitry is further configured to detect the initial slip at each of the finger portions on a basis of a detection result of the pressure distribution sensor.

10. The information processing device according to claim 9, wherein the circuitry is further configured to calculate an inclination of the finger portion gripping the object on a basis of a direction of the initial slip and a force detected by the pressure distribution sensor of each of the finger portions, and control an operation of the arm portion on a basis of the calculated inclination.

11. The information processing device according to claim 10, wherein the circuitry is further configured to calculate the inclination of the finger portion on a basis of posture information indicating an amount of movement of a movable part of each of the finger portions.

12. An information processing method performed by an information processing device, the method comprising:

detecting a slip generated in an object gripped by a finger portion constituting a grip portion that is provided on an arm portion;

estimating an external force and an external moment applied to the object on a basis of the slip generated in the object; and controlling an operation of the arm portion on a basis of the external force and the external moment to adjust at least one of a position and a posture of the finger portion constituting the grip portion, wherein the finger portion includes an elastic body that comes into contact with the object when the object is gripped, and a pressure distribution sensor that detects a distribution of pressure applied to the elastic body, and the method further comprises detecting an initial slip in which a fixed portion and a slip portion are mixed between the object and the elastic body on a basis of a detection result of the pressure distribution sensor, and estimating directions and amounts of the external force and the external moment applied to the object on a basis of a direction and an amount of the initial slip.

13. A non-transitory computer-readable medium storing program causing a computer to execute processing comprising:

detecting a slip generated in an object gripped by a finger portion constituting a grip portion that is provided on an arm portion;

estimating an external force and an external moment applied to the object on a basis of the slip generated in the object; and controlling an operation of the arm portion on a basis of the external force and the external moment to adjust at least one of a position and a posture of the finger portion constituting the grip, wherein the finger portion includes an elastic body that comes into contact with the object when the object is gripped, and a pressure distribution sensor that detects a distribution of pressure applied to the elastic body, and the processing further comprises detecting an initial slip in which a fixed portion and a slip portion are mixed between the object and the elastic body on a basis of a detection result of the pressure distribution sensor, and estimating directions and amounts of the external force and the external moment applied to the object on a basis of a direction and an amount of the initial slip.

* * * * *